United States Patent [19]

Cannistra et al.

[11] Patent Number: 4,633,507
[45] Date of Patent: Dec. 30, 1986

[54] APPARATUS FOR READING MARK SHEETS

[76] Inventors: Anthony T. Cannistra, 13 Holiday Dr., Woodstock, N.Y. 12498; Masuyoshi Kida, A-209 Koyo-Mansion 360-9 Katase, Fujisawa, Kanagawa, Japan; Min-Hsiung G. Tung, 2519 Lawton Bluff, Matthews, N.C. 28105; Tatsuyuki Ushiroda, 906 Shonandai-Kyodo Building, 7 Kameino, Fujisawa, Kanagawa, Japan

[21] Appl. No.: 533,315
[22] Filed: Sep. 16, 1983
[30] Foreign Application Priority Data Sep. 17, 1982 [JP]  Japan ................ 57-161096

[51] Int. Cl.⁴ ............................................. G06K 9/20
[52] U.S. Cl. ........................................ 382/61; 382/46
[58] Field of Search ............ 382/46, 48, 61, 67; 235/460, 461

[56]  References Cited
U.S. PATENT DOCUMENTS 3,337,766  8/1967  Malaby ................... 315/18
3,553,437  1/1971  Boothroyd ............... 382/61
3,553,646  1/1971  Hardin et al. ........... 340/146.3
3,763,467  10/1973 Cash et al. .............. 340/146.3
3,885,229  5/1975  Negita et al. ........... 382/61
4,300,123  11/1981 McMillin et al. ......... 382/61
4,558,461  12/1985 Schlang ................. 382/46

FOREIGN PATENT DOCUMENTS 50-8411  1/1975  Japan .

Primary Examiner—David K. Moore
Assistant Examiner—Jacqueline Todd

[57] ABSTRACT

Apparatus with optical detecting device for reading a mark sheet provided with plural mark rows, each of which includes a reference mark, a skew detection mark and mark writing regions. The apparatus reads the mark sheet by use of a predetermined nominal scan window address for each of the regions. Optical shift of the optical detecting device is detected and the scan window addresses are corrected in accordance with the detected shift. Further, skew of the mark sheet is detected, and scan lines for reading the mark sheet is selected in accordance with the detected skew.

4 Claims, 30 Drawing Figures

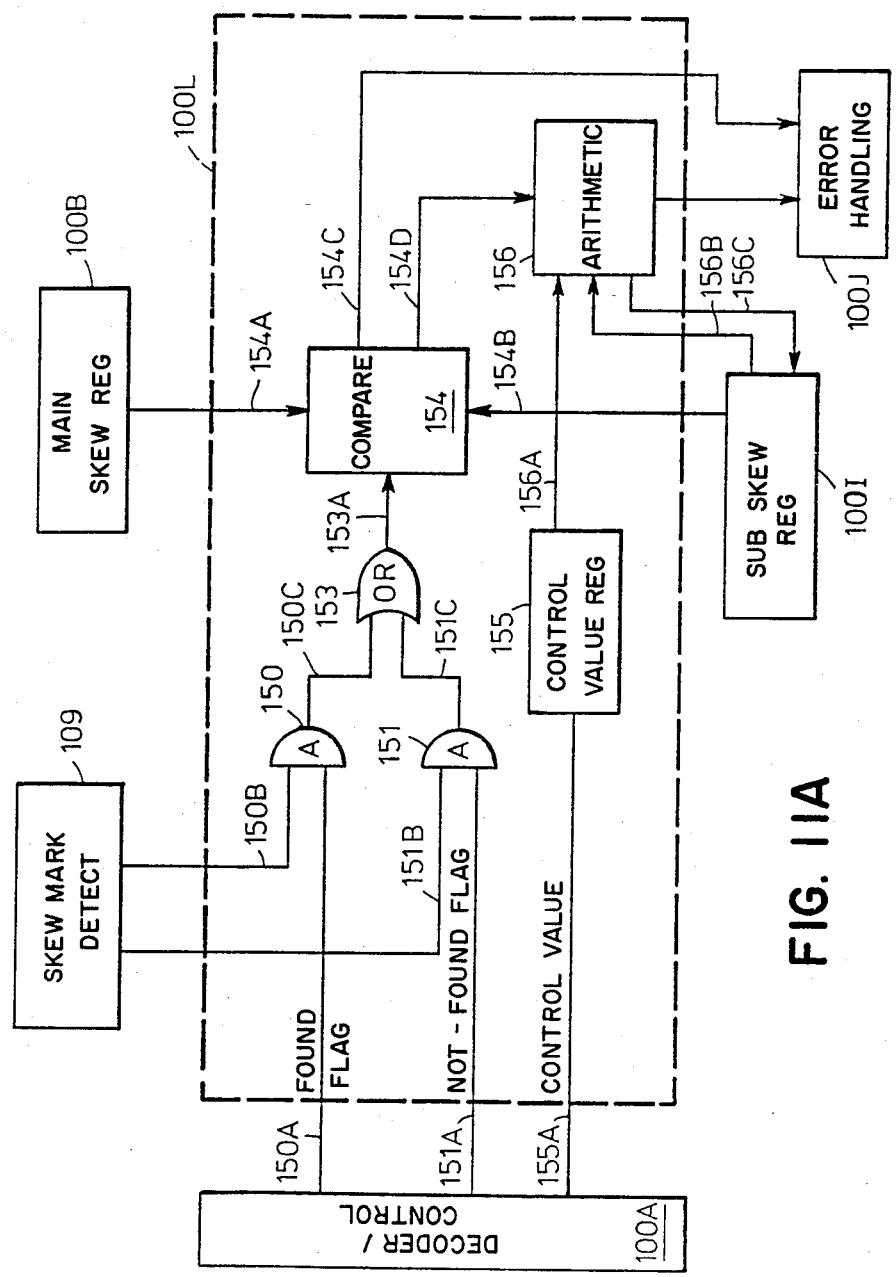
FIG. IIA

APPARATUS FOR READING MARK SHEETS

FIELD OF THE INVENTION

This invention relates to a mark sheet reader, and more particularly to a reader of mark sheets used in facsimile systems, which has mark regions for designating the mail address, scanning resolution, etc., of documents to be transmitted and control mark regions for reading said mark regions, with a reading accuracy improved by detecting the shift of the optical system in the optical detecting device at the read of the mark sheet, thereby correcting the scan window address for reading the mark regions in the scanning line direction, detecting the skew of mark sheets, and selecting some scanning lines in response to the detected skew.

BACKGROUND OF THE INVENTION

Heretofore, the mark sheet designating the address and scanning line resolution of a document has been scanned by means of the optical detecting device of a facsimile apparatus before a document is scanned or read by the facsimile apparatus. A plurality of mark writing regions, or user mark regions, are arranged on a mark sheet in rows and columns, and the user is requested to mark regions by black color. Said optical detecting device is, for example, a CCD (charge coupled device) array in which a plurality of optical sensor elements are arranged in line. The mark sheet is moved to traverse the optical detecting device so that the mark rows are sequentially scanned. The mark sheet is illuminated with a light source, and the marks are detected by directing the reflected light to the optical detecting device through lens.

When the mark sheet travels through the optical sensor, the mark sheet undesirably skews and some or all mark regions in a mark row are out of the optical sensor, resulting in decreased reading accuracy. In order to solve this problem, a published unexamined Japanese patent application No. 50-8411 (1975) discloses a solution wherein two special marks, i.e., a reference mark and a skew detecting mark, are provided on the left and right ends of the uppermost, or the first mark row of the mark sheet, and the scanning lines are switched over by detecting the skew of the mark sheet. However, the method of published unexamined patent application No. 50-8411 cannot be applied to the reader to scan only mark regions by giving addresses to optical sensor elements linearly arrayed in order from an end, and designating the addresses corresponding to the mark regions, or the scan window addresses as in the present invention. The width of the mark regions in the scanning line direction is normally specified to be narrow (e.g. 2 mm), and the scan window addresses must be aligned correctly against the mark regions during reading the mark sheet. However, if the skew of the mark sheet changes while the mark sheet travels, the above alignment is lost and correct mark reading is not possible. By the above method of the published unexamined patent application No. 50-8411, the alignment problem is not solved because the skew of the mark sheet is detected only at the leading portion of the mark sheet and the scanning lines are selected equally for all the mark rows.

The above misalignment is also caused by the enlargement or reduction of the sheet image due to the deviation of the lens fixing device or the variation of the optical characteristics of the lens itself, the use of the mark sheet having dimensionally misprinted portions, or the change in the skew of the mark sheet during reading the mark sheet, and the marks cannot be read accurately. The present invention solves such problems.

DISCLOSURE OF THE INVENTION

First, the nominal scan window address is described. As described above, the scan window addresses are provided to correspond to each of the mark regions in the mark row, and the marks are read by energizing only sensor elements of the scan window addresses. The scan window address predetermined to correspond to the nominal mark regions on the mark sheet is referred to as the nominal scan window address.

The present invention comprises a means for forming actual scan window addresses for the first mark row by detecting, from the scan signals obtained by scanning the mark sheet provided with a reference mark and a skew detecting mark (hereinafter referred to as skew mark) in each mark row, the distance between the reference mark and the skew mark in the first mark row, and correcting said nominal scan window address according to the difference between said detected distance and the nominal distance, a means for forming actual scan window addresses for the second mark row by detecting the position of the reference mark in the second mark row from the above scan signals, and correcting actual scan window addresses for the first mark row according to the difference between said detected position and the position of the reference mark of the first mark row, and a means for reading marks by extracting signals from the scan signals of mark writing regions of the first and second mark rows by the use of said actual scan window addresses for the first and second mark rows, respectively.

The invention also includes a means for detecting the skew of the mark sheet with respect to the mark sheet reader by means of a scan signal of the skew mark produced by a group of selected scan lines for each mark row and selecting a group of scan lines used for read operation among the scan lines for next mark row.

Detection of Skew Direction

First, the upper edge of the reference mark in the first mark row, is detected and it is checked if the skew mark is detected on the scan line, which has detected the upper edge of the reference mark (referred to as the reference scan line). By this procedure, the direction of the skew of the mark sheet against the optical detecting device, i.e., whether it is right side up or right side down, is determined. If the skew mark is present, the mark sheet is determined as skew with right side up, and if the skew mark is not detected, the mark sheet is determined as skew with right side down. According to this skew direction, a group of scan lines for reading the first mark row and for determining angle of skew is selected. As the group of scan lines, only required scanning lines among a plurality of scan lines traversing the length of the mark region. Said group of scan lines includes scan line for detecting the distance between the left edge of the reference mark and the left edge of the skew mark and for reading the user mark regions, and scanning line for detecting the lower edge of the skew mark, or the skew detecting mark, to find the angle of skew. The allowable angle of skew on processing the first mark row is made smaller than the allowable angle of skew on processing the second and remaining mark rows. The scan line for processing the first mark row is selected based on the reference scan line.

Correction of Nominal Scan Window Address for Setting Actual Scan Window Address for First Mark Row The presence or absence of the skew mark is detected by using scan lines in said group of scan lines. The scan lines are so selected as to judge excess skew beyond said allowable angle of skew unless the scan lines detect the presence of the skew mark. When the skew mark is detected, the distance between the left edge of the reference mark and the left edge of the skew mark is determined. This indicates the distance between both marks actually projected on the optical detecting device from the mark sheet; and if deviation is caused by error in mounting of the lens due to shock after adjustment, or other reasons, the distance is slightly enlarged or reduced due to the deviation. The reference distance or the nominal distance between both mark regions in the case where the lens is adjusted at the proper position, can also be obtained from the reference mark and skew mark scan window addresses among said nominal scan window addresses. By comparing said actually detected distance with the nominal distance, the difference between the both distances due to the deviation of the optical system is determined. Then, the nominal scan window addresses are corrected so that the difference becomes zero. This correction is made by entirely correcting the nominal scan window addresses by said difference in distances. The addresses thus obtained is called as actual scan window addresses.

Read of First Mark Row

The signals are sampled from the scan signals on the user mark regions by using the actual scan window address, to read the mark.

In the user mark regions in the first mark row, a mark pattern or other identification which indicates that this sheet is the mark sheet may be printed at shipment.

Detection of the Skew Angle of First Mark Row

The direction of skew of the mark sheet was detected based upon whether or not the skew mark was detected on the reference scan line which detected the upper edge of the reference mark of the first row. The degree of skew is determined by checking the relative positional relation (up and down) between the reference and skew marks. Actually, the relative position of the lower or upper edge of the skew mark to the reference mark is obtained by scan lines in the group in accordance with the skew direction, i.e., the right side up or right side down. For example, if the skew direction is right side up, the lower edge of the skew mark is offset than in the move direction of the mark sheet with respect to the optical sensors, or the scan line. Therefore, the skew angle is detected based upon which scan line detected the lower edge of the skew mark.

Processing of Second Mark Row

Before starting processing of the second mark row, a group of scan lines is selected according to the direction and angle of skew of the mark sheet detected when the first mark row was processed. This group of scan lines includes scan lines for detecting the upper and left edges of the reference mark, scan lines for reading the user mark regions, and scan lines for detecting the direction and angle of skew of the mark sheet. The processing operation for the second mark row using said group of scan lines includes the detection of the reference mark and the detection of the skew mark.

In the detection of the reference mark, the position of the left edge of the reference mark is detected, and this detected position is compared with the position of the left edge of the reference mark in the first mark row. The result "Not Equal" of the comparison indicates that the mark sheet has been shifted in the direction of the mark row due to change of skew of the mark sheet against the optical sensor in the period between the process of the first mark row and the process of the second mark row. Then, the actual scan window address for the first mark row is corrected or adjusted by shifting by the difference found in said comparison, so that the actual scan window address for reading the second mark row is formed.

Using this actual scan window address for the second mark row, the mark is read by sampling the signals from the scan signals over the user mark regions. By the detection of the skew mark, the direction and angle of skew of the mark sheet at the read of the second mark row is detected.

Processing of Third Mark Row

A new group of scan lines for the third mark row is selected according to the direction and angle of skew detected during the process of, the second mark line. This group of scan lines, like the group of scan lines used for processing the second mark line, includes scan lines for detecting the upper and left edges of the reference mark scan lines for reading the user marks, and scan lines for detecting the direction and angle of skew of the mark sheet. Using this new group of scan lines, the same process as that for the second mark row is carried out. As in cases of the second and third mark rows, a new group of scan lines for the fourth mark row is selected based upon the direction and angle of skew detected at the process of the third mark row. Each time a mark row is read, the direction and angle of skew of the line is measured, and based upon this measurement, a group of scan lines for reading the next mark row is selected.

BRIEF DESCRIPTION OF THE DRAWINGS

FIG. 11A is a circuit diagram to determine the skew range.

DETAILED DESCRIPTION OF THE PREFERRED EMBODIMENT

Figure 1A:
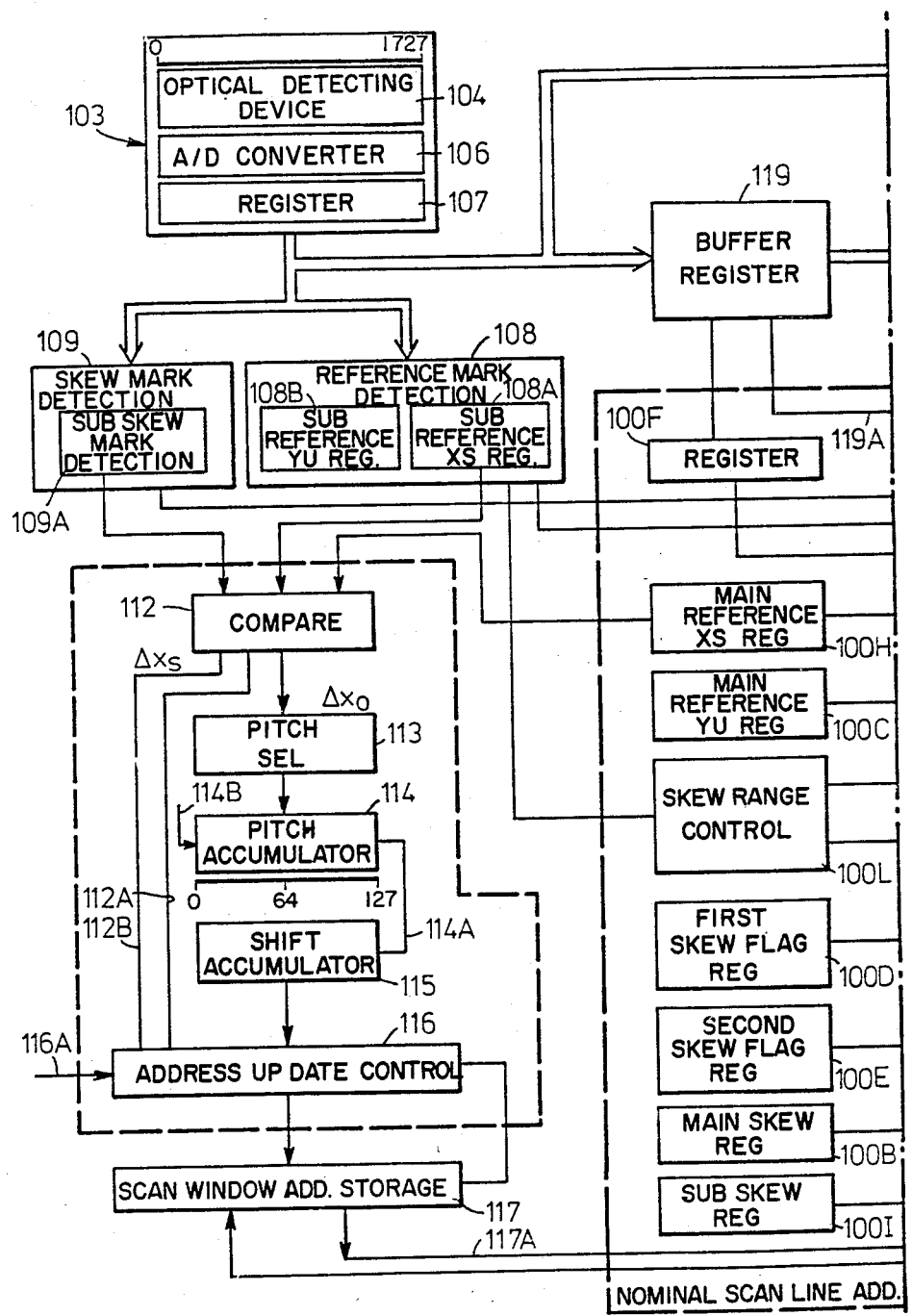
FIGS. 1A and 1B are schematic circuit diagrams of operations of this invention.
Figure 1B:
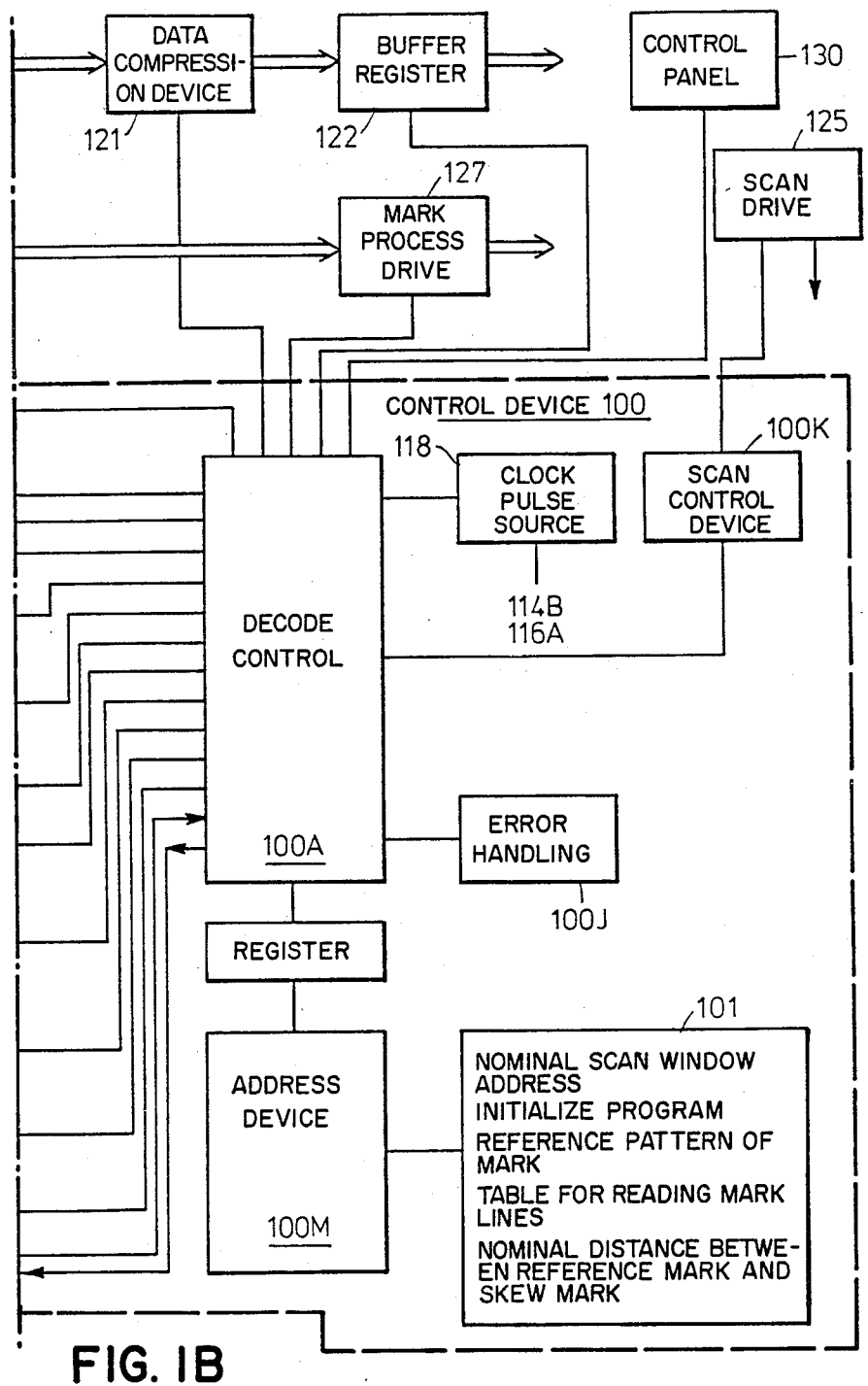
Figure 2:
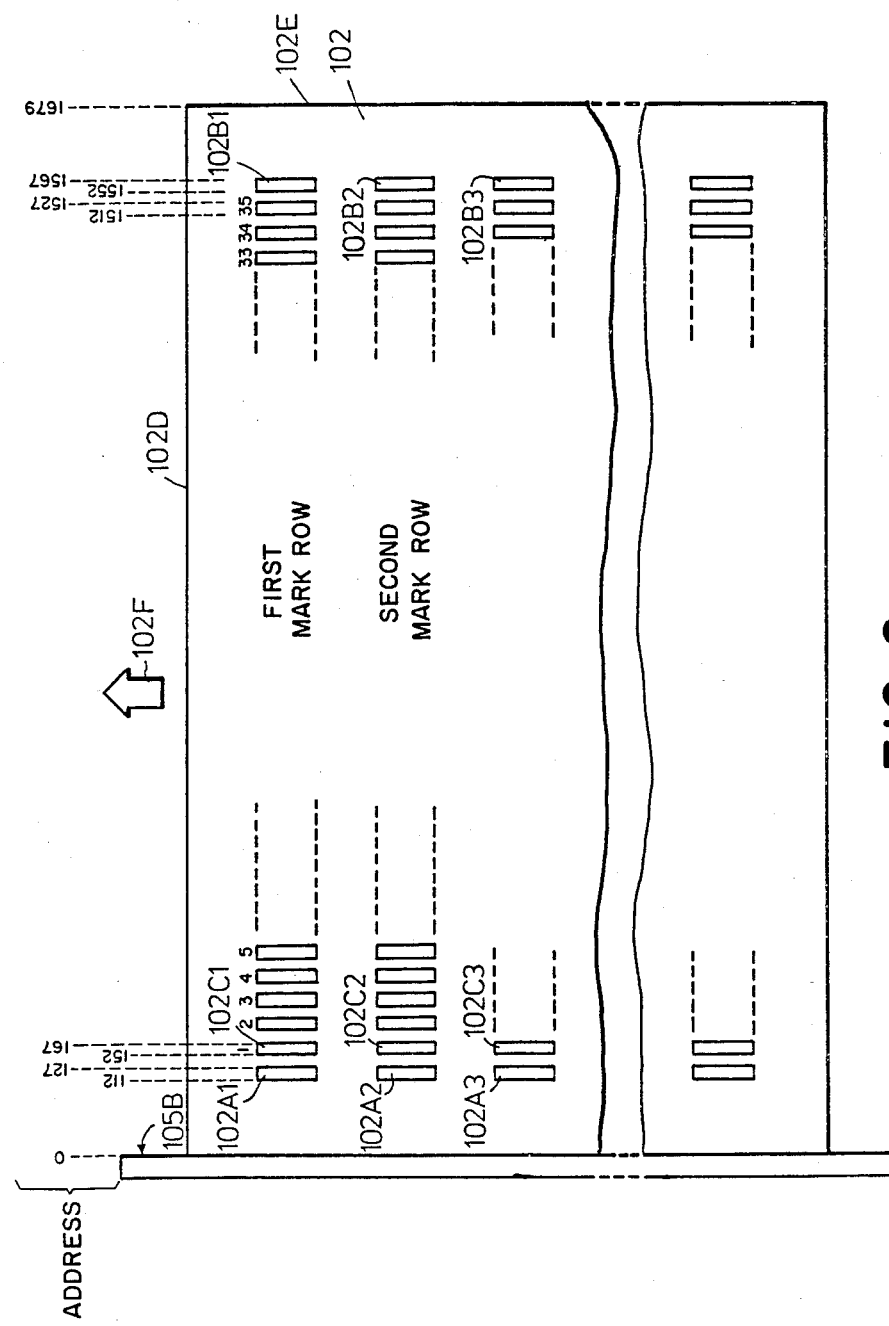
FIG. 2 is a diagram showing the format of the mark sheet.
Figure 3C:
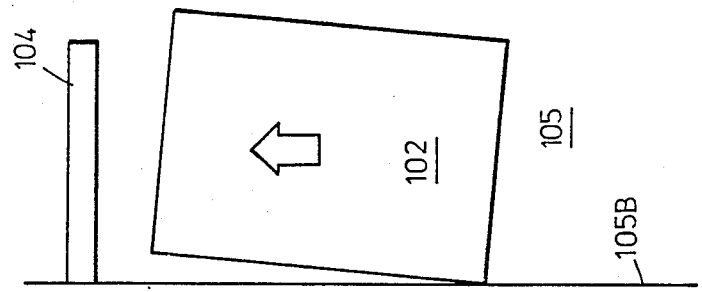
FIGS. 3A, 3B and 3C are diagrams showing the movement of the mark sheet on the sheet path.
Figure 3B:
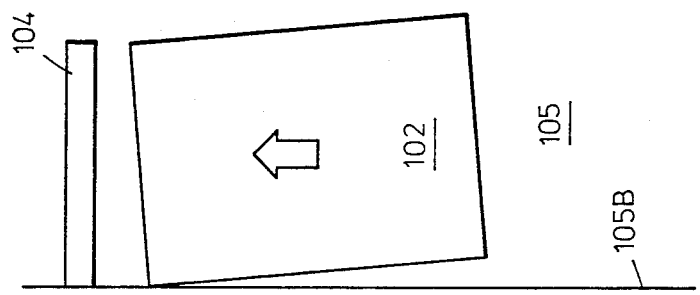
Figure 3A:
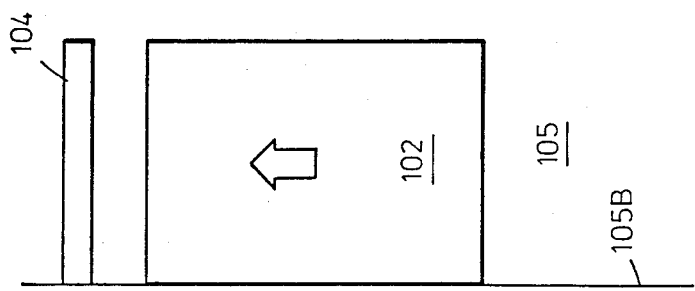

FIGS. 1A and 1B show schematically the circuit configuration for the read operation according to this invention. FIG. 2 shows schematically the mark sheet 102 of this invention, and FIGS. 3A, 3B and 3C show that the mark sheet 102 travels on the mark sheet path 105 without skew, right side up and right side down against the optical detecting device 104, respectively. As illustrated in FIGS. 3A, 3B and 3C, the mark sheet path 105 has a reference edge 105B (note FIG. 2 also) which operates as a guide for traveling mark sheet 102. Utilization of the reference edge 105B is explained herein with respect to FIG. 2. The optical detecting device 104 senses the marks of the mark sheet when it passes through the optical detecting device 104. The detail of optical detecting device 104 operation is described herein below.

Referring to FIGS. 1A and 1B, the optical detecting device 104 has a plurality of (e.g. 1,680) sensor elements, and is shown in a block 103 together with an A/D converter 106 and a register 107. Detail of the A/D converter 106 and the register 107 are not described because these are well known in this field. Digital image data detected by the block 103 are transmitted to two parts of the circuit. One part includes a data compression device 121 and a buffer register 122. Note that the block 103 reads two kinds of sheets, i.e., the mark sheet and the document sheet to be transmitted. The digital image data of the transmitted document sheet are supplied to the above part and compressed, and fed to the transmission line through the transmission adapter (not shown in the drawing).

The other part is the part to process the mark sheet according to this invention, and includes a reference mark detection circuit 108, a skew mark detection circuit 109, a compensation device 111, a control device 100, a buffer register 119, a mark process device 127 and a scan window address storage device 117. The control device 100 has a decode/control circuit 100A, which controls all the circuits. This device 100A functions as a CPU. An operator control panel and scan drive circuit 125 are also included. The scan drive circuit 125 is provided for driving the scan mechanism. The mark process circuit 127 samples the corresponding signals to the address from the scan signals of the user mark region from the buffer register 119 based upon the scan window addresses given under the control of the control device 100, and judges black and white levels to read the mark region.

The control device 100 has a memory 101, in which nominal scan window addresses, the initialization program, the reference pattern of mark, the mark row read table, and the nominal distance between the reference mark and the skew mark are stored.

First, the mark sheet 102 shown in FIG. 2 and the nominal scan window address for the mark sheet are described.

The mark sheet 102 has short edges 102D and long edges 102E, and the short edges of the mark sheet has length of 210 mm. As shown in FIG. 2, rectangular mark regions of the same size, i.e., reference mark regions 102A1, 102A2, 102A3, . . . , skew mark regions 102B1, 102B2, 102B3, . . . , and user mark regions 102C1, 102C2, 102C3, . . . are arranged in rows and columns. The left edges of the reference mark regions 102A1, 102A2, 102A3, . . . are arranged on the line parallel to the left edge of the mark sheet 102, and the left edges of the skew mark regions 102B1, 102B2, 102B3, . . . are arranged on the line parallel to the above line. The arrow 102F shows the feed direction of the mark sheet. Thirty-five user mark regions are provided for one mark row. For an A4 size sheet, the distance between the left edge of the mark sheet and the center of the reference mark is 15 mm, and the width of the mark region is 2 mm which is defined by the distance of 1 mm from the center of the reference mark. The widths of the user mark regions and the skew mark regions are also 2 mm. The distance between the centers of each mark is 5 mm. The length of each mark region is 7 mm. All dimensions are identical for letter-size paper (216 mm × 279 mm) except that the distance between the left edge of the sheet and the center of the reference mark is 18 mm rather than 15 mm. The algorithm described handles both sizes of paper without change after detecting the reference mark. The following dimensions apply to A4 paper only for clarity.

When the resolution is 8 picture elements (PEL)/mm and the scan line density is 7.7 lines/mm, the total number of the sensor elements are 1,680, and addresses are assigned to them from the left in order as 0, 1, 2, . . . , 1679. The sensor element of address 0 is aligned with the reference edge on guide 105B of the mark sheet path 105. Therefore, as shown in FIGS. 2 and 3A, when the left edge of the mark sheet 102 is positioned at the reference edge 105B of the mark sheet path 105, the reference mark region is defined by addresses 112–127, first user mark region following to the reference mark region is defined as addresses 152–167, the 35th user mark region is specified as addresses 1512–1527, and the skew mark region is specified as addresses 1552–1567.

The reference mark region, the skew mark region and some user mark regions are printed at its shipment in black for entire width of 2 mm. The frame of the user mark regions are printed in a color, e.g. blue, which cannot be sensed by the optical detecting device, and the user is requested to mark in black in this frame. The width of markings made by the user might be therefore narrower than 2 mm, the width of the marking by user is assumed to be 2 mm in this description for convenience.

The addresses of the above mark regions are said nominal scan window addresses, which indicate the addresses for causing said optical detecting device to correctly read each mark region correctly in the case that the optical system is adjusted as specified, and the mark sheet is positioned properly on the mark sheet path.

Next, the method of reading according to this invention is described.

Initialization

Referring to FIGS. 1A and 1B, initialization can be made by the operator by energizing a suitable operation starting button or switch (not shown in the drawing) on the control panel 130. The decoder control device 100A responds to this activation and reads the initialization program routine in the memory 101 to perform the initialization. Then, the nominal scan window address in the memory 101 is stored into the scan window address memory 117.

Table pointer 1 of the "mark row read start table" among a plurality of mark row read tables in the memory 101 is stored in the main skew register 100B.

Description of Mark Row Read Tables

The above mark row read tables are described here. These tables consist of three tables used in the process of the first mark row and eight tables used in the process of the other mark rows. As shown in Table 1, each table has a table pointer to address them. Each table also has information for selecting said group of scan lines and information for accompanying operation. The three tables for the first mark row consist of a mark row read start table of the first mark row (Table 2), and the first mark row process tables (Tables 3 and 4) selected depending on the skew direction of the mark sheet detected in the processing procedure of the mark row read start table. The eight tables (Tables 5 through 12) for the remaining mark rows is selected depending on the direction and angle of skew of the mark sheet detected according to processing procedures of Tables 3 and 4.

The reason for using eight tables in this embodiment is that four ranges of skew were selected for each of right side up skew and right side down skew. This number may be changed as required. Table 1 indicates the contents and table pointers of these eleven tables, numbers of reference tables and reference drawings. Table 1 shows process operations according to Tables 2, 3 and 4 that are shown by flowcharts in FIGS. 4A, 4B, 6, 7A through 7C, and 8A through 8C, while processes according to Tables 11 through 18 are schematically shown in FIGS. 4C through 4J.

TABLE 1

| Table Pointer | Content | Reference Table | Reference Drawing |
|---|---|---|---|
| 1 | Mark row read start | 2 | 4A, 4B, 6 |
| 2 | Mark row process (right side up) | 3 | 4A, 7 |
| 3 | Mark row process (right side down) | 4 | 4B, 8 |
| 11 | −2.0° to −1.6° (right side down) | 5 | 4C |
| 12 | −1.6° to −1.2° (right side down) | 6 | 4D |
| 13 | −1.2° to 0.8° (right side down) | 7 | 4E |
| 14 | −0.8° to 0° (right side down) | 8 | 4F |
| 15 | 0° to +0.8° (right side up) | 9 | 4G, 10 |
| 16 | +0.8° to +1.2° (right side up) | 10 | 4H |
| 17 | +1.2° to +1.6° (right side up) | 11 | 4I |
| 18 | +1.6° to +2.0° | 12 | 4J |

TABLE 2

MARK LOW READ START TABLE
(TABLE POINTER: 1)
(FIGS. 4A, 4B AND 6)

| SCAN LINE | OPERATIONS |
|---|---|
| REFERENCE SCAN LINE | (1) LOCATE THE REFERENCE MARK<br>(2) DETERMINE THE LEFT EDGE POSITION AND THE UPPER EDGE AND STORE THEM IN REGISTERS 108A AND 108B, RESPECTIVELY<br>(3) CHECK FOR THE SKEW MARK IN THE REFERENCE SCAN LINE<br>  (A) IF PRESENT, PROCESS AS POSITIVE |

TABLE 2-continued

MARK LOW READ START TABLE
(TABLE POINTER: 1)
(FIGS. 4A, 4B AND 6)

| SCAN LINE | OPERATIONS |
|---|---|
| | (RIGHT SIDE UP) SKEW, TABLE POINTER 2<br>(B) IF NOT PRESENT, PROCESS AS NEGATIVE (RIGHT SIDE DOWN) SKEW, TABLE POINTER 3<br>(4) GO TO NEXT TABLE |

TABLE 3

MARK ROW PROCESS (RIGHT SIDE UP) TABLE
(TABLE POINTER: 2)
(FIGS. 4A AND 7)

| SCAN LINE | OPERATIONS |
|---|---|
| 52 | LOCATE THE SKEW MARK IN THE LINE<br>(1) IF NOT FOUND/NONCOVER SHEET (END)<br>(2) IF FOUND:<br>  (A) DETERMINE DISTORTION & BUILD ACTUAL SCAN WINDOW ADDRESS<br>  (B) DO MARK COLLECTION<br>  (C) SAVE THE RECO BAND PATTERN<br>  (D) GOTO LINE 80 |
| 80 | (1) CHECK FOR THE SKEW MARK IN THE LINE<br>  (A) IF FOUND SET REGISTER 100D<br>  (B) IF NOT FOUND RESET REGISTER 100D<br>  (C) GOTO LINE 88 |
| 88 | (1) CHECK FOR THE SKEW MARK IN THE LINE<br>  (A) IF FOUND SET REGISTER 100E<br>  (B) IF NOT FOUND RESET REGISTER 100E<br>(2) CHECK THE PATTERN SAVED ON LINE 52<br>  (1) NOT COVER SHEET (END)<br>  (2) UPSIDE DOWN COVER SHEET (END)<br>  (A) IF COVER SHEET<br>    (1) SAVE TYPE FIELD<br>    (2) SAVE BAND COUNT<br>    (3) IF REGISTERS 100D, 100E =<br>      00 = EXCESS SKEW (END)<br>      01 = ERROR (END)<br>      10 = NEXT POSITIVE 0.8 TO 1.2 DEGREES<br>      11 = NEXT POSITIVE 0 TO 0.8 DEGREES<br>(4) IF NOT ENDED GOTO FIRST USER MARK ROW |

TABLE 4

MARK ROW PROCESS (RIGHT SIDE DOWN) TABLE
(TABLE POINTER: 3)
(FIGS. 4B AND 8)

| SCAN LINE | OPERATIONS |
|---|---|
| 20 | (1) CHECK FOR THE SKEW MARK IN THE LINE<br>  (A) IF FOUND SET REGISTER 100D<br>  (B) IF NOT FOUND RESET REGISTER 100D<br>  (C) GOTO LINE 28 |
| 28 | (1) CHECK FOR THE SKEW MARK IN THE LINE<br>  (A) IF FOUND SET REGISTER 100E<br>  (B) IF NOT FOUND RESET REGISTER 100E<br>  (C) GOTO LINE 52 |
| 52 | LOCATE THE SKEW MARK ON THE LINE<br>(1) IF NOT FOUND/NONCOVER SHEET (END)<br>(2) IF FOUND:<br>  (A) DETERMINE DISTORTION & BUILD ACTUAL SCAN WINDOW ADDRESS<br>  (B) DO MARK COLLECTION<br>  (C) CHECK PATTERN FOR COVER SHEET |

TABLE 4-continued

MARK ROW PROCESS (RIGHT SIDE DOWN) TABLE
(TABLE POINTER: 3)
(FIGS. 4B AND 8)

| SCAN LINE | OPERATIONS | |
|---|---|---|
| | (1) NOT COVER SHEET | (END) |
| | (2) UPSIDE DOWN COVER SHEET | (END) |
| (D) | IF COVER SHEET | |
| | (2) IF REGISTER 100D, 100E = | |
| | 00 = EXCESS SKEW | (END) |
| | 01 = NEXT NEGATIVE 0.8 TO 1.2 | DEGREES |
| | 10 = ERROR | (END) |
| | 11 = NEXT NEGATIVE 0 TO 0.8 | DEGREES |
| | (3) SAVE BAND COUNT | |
| | (4) SAVE TYPE FIELD | |
| | (3) IF NOT ENDED GOTO FIRST USER MARK ROW | |

TABLE 5

−2.0° TO −1.6° TABLE
(TABLE POINTER - SKEW RANGE: 11)
(FIG. 4C)

| SCAN LINE | OPERATIONS |
|---|---|
| REFERENCE SCAN LINE | (1) LOCATE THE REFERENCE MARK |
| | (2) ADJUST THE DISTORTION TABLE TO GET THE ACTUAL SCAN WINDOWS (BASED ON TOP BAND DIST. & LOC REF MK. IN THIS SWP) |
| | (3) GOTO LINE 40 |
| 40 | (1) CHECK THE SKEW MARK IN THE LINE IF FOUND; SET FOUND FLAG TO 1, AND SET CONTROL VALUE TO +1 |
| | (2) SWEEP MARKS 1 THRU 18 INCLUSIVE SAVING THE COUNTS |
| | (3) GOTO LINE 48 |
| 48 | (1) CHECK THE SKEW MARK IN THE LINE IF NOT FOUND; SET NOT FOUND FLAG TO 1, AND SET CONTROL VALUE TO +1 |
| | (2) SWEEP MARKS 1 THRU 18 INCLUSIVE SAVING THE COUNT |
| | (3) SUM THE COUNTS WITH THOSE ON LINE 40 - THRESHOLD AND SAVE THE RESULTS |
| | (4) GOTO LINE 56 |
| 56 | (1) CHECK THE SKEW MARK IN THE LINE IF NOT FOUND; SET NOT FOUND FLAG TO 1, AND SET CONTROL VALUE TO ERROR (80) |
| | (2) SWEEP MARKS 19 THRU 36 GATHERING THE COUNTS |
| | (3) GOTO LINE 64 |
| 64 | (1) CHECK THE SKEW MARK IN THE LINE IF NOT FOUND; SET NOT FOUND FLAG TO 1, AND SET CONTROL VALUE TO ERROR (80) |
| | (2) SWEEP MARKS 19 THRU 36 INCLUSIVE SAVING THE COUNT |
| | (3) SUM THE COUNTS FOR MARKS WITH THOSE ON LINE 56 - THRESHOLD AND SAVE THE RESULTS |
| | (4) GOTO THE NEXT USER MARK ROW |

TABLE 6

−1.6° TO −1.2° TABLE
(TABLE POINTER - SKEW RANGE: 12)
(FIG. 4D)

| SCAN LINE | OPERATIONS |
|---|---|
| REFERENCE SCAN LINE | (1) LOCATE THE REFERENCE MARK |
| | (2) ADJUST THE DISTORTION TABLE TO GET THE ACTUAL SCAN WINDOW ADDRESS (BASED ON TOP BAND DIST. & LOC REF MK. IN THIS SWP) |
| | (3) GOTO LINE 28 |
| 28 | (1) CHECK THE SKEW MARK IN THE LINE IF FOUND; SET FOUND FLAG TO 1, AND SET CONTROL VALUE TO +1 |
| | (2) SWEEP MARKS 1 THRU 18 INCLUSIVE SAVING THE COUNTS |
| | (3) GOTO LINE 40 |
| 40 | (1) CHECK THE SKEW MARK IN THE LINE |

TABLE 6-continued

−1.6° TO −1.2° TABLE
(TABLE POINTER - SKEW RANGE: 12)
(FIG. 4D)

| SCAN LINE | OPERATIONS |
|---|---|
| | IF NOT FOUND; |
| | SET NOT FOUND FLAG, AND |
| | SET CONTROL VALUE TO −1 |
| | (2) SWEEP MARKS 1 THRU 18 INCLUSIVE SAVING THE COUNT |
| | (3) GOTO LINE 48 |
| 48 | (1) CHECK THE SKEW MARK IN THE LINE IF NOT FOUND; SET NOT FOUND FLAG, AND SET CONTROL VALUE TO ERROR |
| | (2) SWEEP MARKS 19 THRU 36 GATHERING THE COUNTS |
| | (3) GOTO LINE 60 |
| 60 | (1) CHECK THE SKEW MARK IN THE LINE IF NOT FOUND; SET NOT FOUND FLAG, AND SET CONTROL VALUE TO ERROR |
| | (2) SWEEP MARKS 19 THRU 36 INCLUSIVE SAVING THE COUNT |
| | (3) SUM THE COUNTS FOR MARKS WITH THOSE ON LINE 48 - THRESHOLD AND SAVE THE RESULTS. |
| | (4) GOTO THE NEXT USER BAND |

TABLE 7

−1.2° TO −0.8° TABLE
(TABLE POINTER - SKEW RANGE: 13)
(FIG. 4E)

| SCAN LINE | OPERATIONS |
|---|---|
| REFERENCE SCAN LINE | (1) LOCATE THE REFERENCE MARK |
| | (2) ADJUST THE DISTORTION TABLE TO GET THE ACTUAL SCAN WINDOW ADDRESS (BASED ON TOP BAND DIST. & LOC REF MK. IN THIS SWP) |
| | (3) GOTO LINE 20 |
| 20 | (1) CHECK THE SKEW MARK IN THE LINE IF FOUND; SET FOUND FLAG, AND SET CONTROL VALUE TO +1 |
| | (2) GOTO LINE 28 |
| 28 | (1) CHECK THE SKEW MARK IN THE LINE IF FOUND; SET NOT FOUND FLAG, AND SET CONTROL VALUE TO −1 |
| | (2) SWEEP MARKS 1 THRU 18 INCLUSIVE SAVING THE COUNT |
| | (3) GOTO LINE 40 |
| 40 | (1) CHECK THE SKEW MARK IN THE LINE IF NOT FOUND; SET NOT FOUND FLAG, AND SET CONTROL VALUE TO ERROR |
| | (2) SWEEP ALL MARKS GATHERING THE COUNT |
| | (3) SUM THE COUNTS FOR MARKS 1 THRU 18 WITH THOSE ON LINE 28 - THRESHOLD AND SAVE THE RESULTS. |
| | (4) GOTO LINE 52 |
| 52 | (1) CHECK THE SKEW MARK IN THE LINE IF NOT FOUND; SET NOT FOUND FLAG, AND SET CONTROL VALUE TO ERROR |
| | (2) SWEEP MARKS 19 THRU 36 INCLUSIVE SAVING THE COUNT |
| | (3) SUM THE COUNTS FOR THESE MARKS WITH THOSE ON LINE 40 - THRESHOLD AND SAVE THE RESULTS. |
| | (4) GOTO THE NEXT USER MARK ROW |

TABLE 8

−0.8° TO 0° TABLE
(TABLE POINTER - SKEW RANGE: 14)
(FIG. 4F)

| SCAN LINE | OPERATIONS |
|---|---|
| REFERENCE SCAN LINE | (1) LOCATE THE REFERENCE MARK<br>(2) CHECK FOR THE SKEW MARK IN THE LINE<br>　　IF FOUND;<br>　　SET FOUND FLAG, AND<br>　　SET CONTROL VALUE TO +1<br>(3) ADJUST THE DISTORTION TABLE TO GET THE<br>　　SWEEP WINDOWS (BASED ON TOP BAND DIST.<br>　　& LOC REF MK. IN THIS SWP)<br>(4) GOTO LINE 20 |
| 20 | (1) CHECK THE SKEW MARK IN THE LINE<br>　　IF NOT FOUND;<br>　　SET NOT FOUND FLAG, AND<br>　　SET CONTROL VALUE TO −1<br>(2) GOTO LINE 28 |
| 28 | (1) CHECK THE SKEW MARK IN THE LINE<br>　　IF NOT FOUND;<br>　　SET NOT FOUND FLAG, AND<br>　　SET CONTROL VALUE TO ERROR (80)<br>(2) SWEEP ALL MARKS SAVING THE COUNT<br>(3) GOTO LINE 40 |
| 40 | (1) CHECK THE SKEW MARK IN THE LINE<br>　　IF NOT FOUND;<br>　　SET NOT FOUND FLAG, AND<br>　　SET CONTROL VALUE TO ERROR (80)<br>(2) SWEEP ALL MARKS GATHERING THE COUNT<br>(3) SUM THE COUNTS WITH THOSE FOR THE<br>　　SWEEP AT LINE 28 THRESHOLD AND SAVE<br>　　THE RESULTS.<br>(4) GOTO THE NEXT USER MARK ROW |

TABLE 9

0° TO +0.8° TABLE
(TABLE POINTER - SKEW RANGE: 15)
(FIGS. 4G AND 10)

| SCAN LINE | OPERATIONS |
|---|---|
| REFERENCE SCAN LINE | (1) LOCATE THE REFERENCE MARK<br>(2) CHECK FOR THE SKEW MARK IN THE LINE<br>　　IF NOT FOUND;<br>　　SET NOT FOUND FLAG, AND<br>　　SET CONTROL VALUE TO −1<br>(3) ADJUST THE DISTORTION TABLE TO GET THE<br>　　SWEEP WINDOWS (BASED ON TOP BAND DIST.<br>　　& LOC REF MK. IN THIS SWP)<br>(4) GOTO TO LINE 8 |
| 8 | (1) CHECK FOR THE SKEW MARK IN THE LINE<br>　　IF NOT FOUND;<br>　　SET NOT FOUND FLAG, AND<br>　　SET CONTROL VALUE TO ERROR<br>(2) SET NOT FOUND FLAG<br>　　SET CONTROL VALUE TO ERROR<br>(3) SWEEP THE MARKS GATHERING THE COUNT<br>(4) GOTO LINE 20 |
| 20 | (1) CHECK FOR THE SKEW MARK IN THE LINE<br>　　IF NOT FOUND;<br>　　SET NOT FOUND FLAG, AND<br>　　SET CONTROL VALUE TO ERROR<br>(2) SWEEP THE MARKS GATHERING THE COUNT<br>(3) SUM WITH COUNT ON LINE 8 AND THRESHOLD<br>　　- SAVE THE RESULTS<br>(4) GOTO LINE 32 |
| 32 | (1) CHECK FOR THE SKEW MARK IN THE LINE<br>　　IF NOT FOUND;<br>　　SET NOT FOUND FLAG, AND<br>　　SET CONTROL VALUE TO +1<br>(2) GOTO NEXT MARK ROW |

TABLE 10

+0.8° TO +1.2° TABLE
(TABLE POINTER - SKEW RANGE: 16)
(FIG. 4H)

| SCAN LINE | OPERATIONS |
|---|---|
| REFERENCE | (1) LOCATE THE REFERENCE MARK |

TABLE 10-continued

+0.8° TO +1.2° TABLE
(TABLE POINTER - SKEW RANGE: 16)
(FIG. 4H)

| SCAN LINE | OPERATIONS |
|---|---|
| SCAN LINE | (2) CHECK FOR THE SKEW MARK IN THE LINE IF NOT FOUND; SET NOT FOUND FLAG, AND SET CONTROL VALUE TO ERROR (80)<br>(3) ADJUST THE DISTORTION TABLE TO GET THE SWEEP WINDOWS (BASED ON TOP BAND DIST. & LOC REF MK. IN THIS SWP)<br>(4) SWEEP MARKS 19 THRU 36 INCLUSIVE GATHERING COUNTS<br>(5) GOTO TO LINE 12 |
| 12 | (1) CHECK FOR THE SKEW MARK IN THE LINE IF NOT FOUND; SET NOT FOUND FLAG, AND SET CONTROL VALUE TO ERROR (80)<br>(2) SWEEP THE ALL MARKS GATHERING THE COUNT<br>(3) ADD THE COUNTS FOR MARK POSITION 19 THRU 36 TO THE COUNT GATHERED IN THE TCP LINE. THRESHOLD AND SAVE THE RESULTS.<br>(4) GOTO LINE 24 |
| 24 | (1) CHECK FOR THE SKEW MARK IN THE LINE IF NOT FOUND; SET NOT FOUND FLAG, AND SET CONTROL VALUE TO +1<br>(2) SWEEP MARKS 1 THRU 18 INCLUSIVE GATHERING THE COUNT ADD TO THE LINE 12 RESULTS THRESHOLD AND SAVE THE RESULTS<br>(3) GOTO LINE 32 |
| 32 | (1) CHECK FOR THE SKEW MARK IN THE LINE IF FOUND; SET FOUND FLAG, AND SET CONTROL VALUE TO −1<br>(2) GOTO NEXT USER MARK ROW |

TABLE 11

+1.2° TO +1.6° TABLE
(TABLE POINTER - SKEW RANGE: 17)
(FIG. 4I)

| SCAN LINE | OPERATIONS |
|---|---|
| −8 | (1) NOTE DISTORTION TABLE USE IS THAT CALCULATED IN THE PREVIOUS ROW<br>(2) SWEEP MARKS 19 THRU 36 INCLUSIVE GATHERING COUNTS<br>(3) LOCATE THE TOP OF THE REFERENCE MARK |
| REFERENCE SCAN LINE | (1) LOCATE THE REFERENCE MARK<br>(2) CHECK FOR THE SKEW MARK IN THE LINE IF NOT FOUND; SET NOT FOUND FLAG, AND SET CONTROL VALUE TO ERROR (80)<br>(3) ADJUST THE DISTORTION TABLE TO GET THE SWEEP WINDOWS (BASED ON TOP BAND DIST. & LOC REF MK. IN THIS SWP)<br>(4) SWEEP MARKS 19 THRU 36 INCLUSIVE GATHERING COUNTS ADD TO THE MARKS FOR LINE −8 THRESHOLD AND SAVE<br>(5) GOTO TO LINE 12 |
| 12 | (1) CHECK THE SKEW MARK IN THE LINE IF NOT FOUND; SET NOT FOUND FLAG, AND SET CONTROL VALUE TO +1<br>(2) SWEEP MARKS 1 THRU 18 GATHERING THE COUNT<br>(3) GOTO LINE 24 |
| 24 | (1) CHECK FOR THE SKEW MARK IN THE LINE IF FOUND; SET FOUND FLAG, AND SET CONTROL VALUE TO −1<br>(2) SWEEP MARKS 1 THRU 18 INCLUSIVE GATHERING THE COUNT ADD TO THE LINE 12 RESULTS - THRESHOLD AND SAVE THE RESULTS<br>(3) GOTO NEXT USER MARK ROW |

TABLE 12

+1.6° TO +2.0° TABLE
(TABLE POINTER - SKEW RANGE: 18)
(FIG. 4J)

| SCAN LINE | OPERATIONS |
| --- | --- |
| −12 | (1) NOTE DISTORTION TABLE USE IS THAT CALCULATED IN THE PREVIOUS ROW<br>(2) SWEEP MARKS 19 THRU 36 INCLUSIVE GATHERING COUNTS<br>(3) GOTO LINE −8 |
| −8 | (1) NOTE DISTORTION TABLE USE IS THAT CALCULATED IN THE PREVIOUS ROW<br>(2) SWEEP MARKS 19 THRU 36 INCLUSIVE GATHERING COUNTS ADD TO THE COUNT FOUND ON LINE −12, THRESHOLD AND SAVE THE RESULTS<br>(3) LOCATE THE TOP OF THE REFERENCE MARK |
| REFERENCE SCAN LINE | (1) LOCATE THE REFERENCE MARK<br>(2) CHECK FOR THE SKEW MARK IN THE LINE IF NOT FOUND; SET NOT FOUND FLAG, AND SET CONTROL VALUE TO ERROR<br>(3) ADJUST THE DISTORTION TABLE TO GET THE SWEEP WINDOWS (BASED ON TOP BAND DIST. & LOC REF MK. IN THIS SWP)<br>(4) GOTO TO LINE 8 |
| 8 | (1) CHECK FOR THE SKEW MARK IN THE LINE IF NOT FOUND; SET NOT FOUND FLAG, AND SET CONTROL VALUE TO +1<br>(2) SWEEP MARKS 1 THRU 18 GATHERING THE COUNT<br>(3) GOTO LINE 12 |
| 12 | (1) CHECK FOR THE SKEW MARK IN THE LINE IF FOUND; SET FOUND FLAG, AND SET CONTROL VALUE TO −1<br>(2) SWEEP MARKS 1 THRU 18 INCLUSIVE GATHERING THE COUNT ADD TO THE LINE 8 RESULTS - THRESHOLD AND SAVE THE RESULTS<br>(3) GOTO NEXT USER MARK ROW |

Detection of Skew Direction of Mark Sheet

Figure 4A:
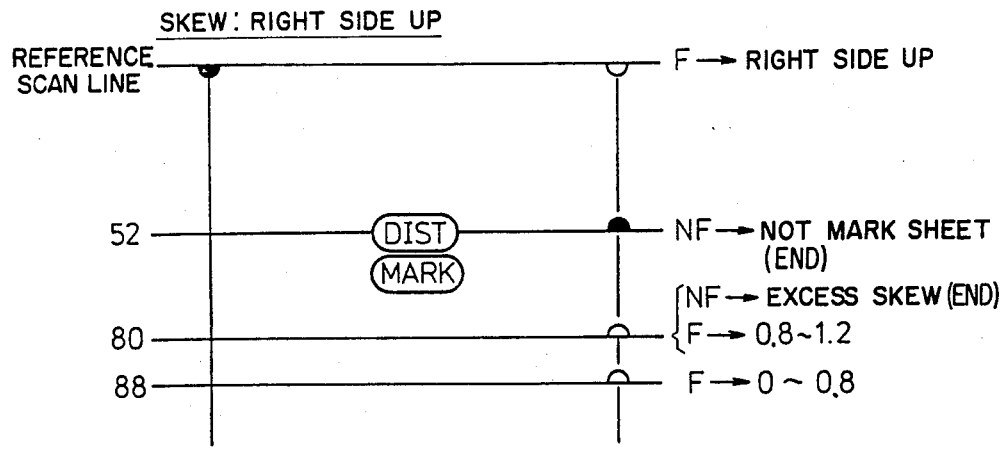
FIGS. 4A, 4B, 4C, 4D, 4E, 4F, 4G, 4H, 4I and 4J are charts showing operations according to this invention.
Figure 4B:
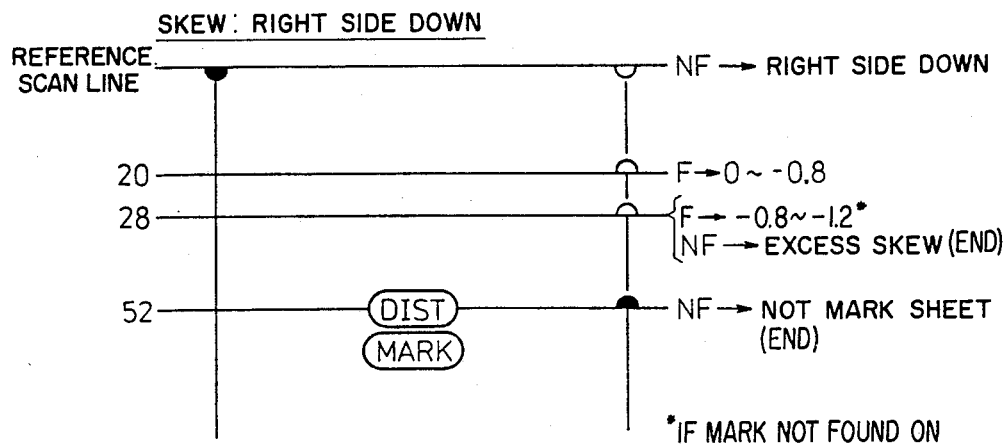
Figure 4C:
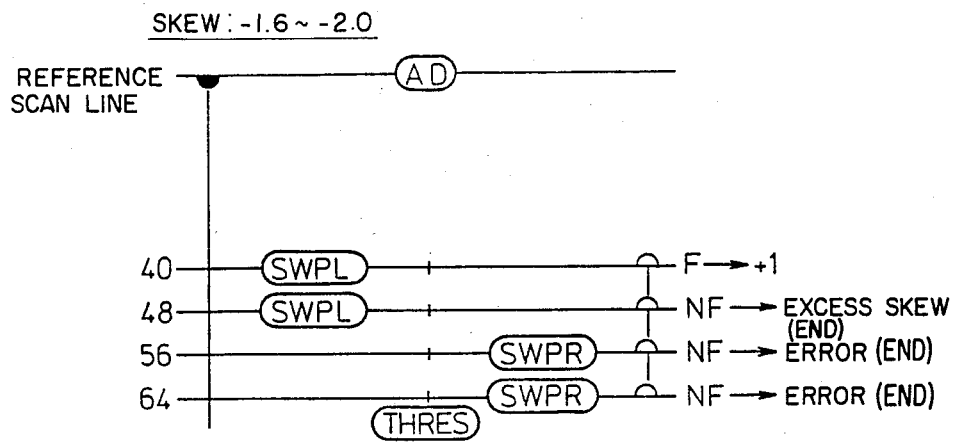
Figure 4D:
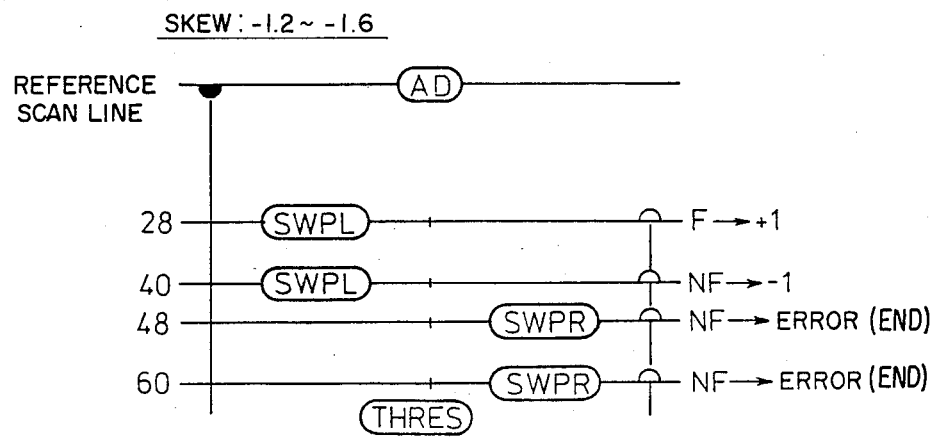
Figure 4E:
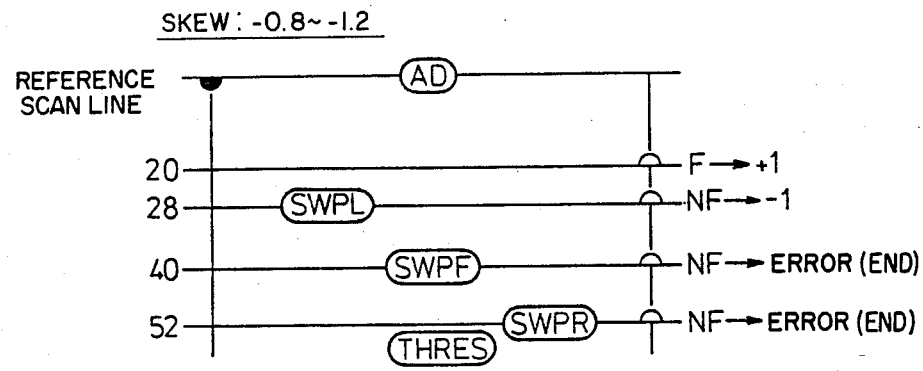
Figure 4F:
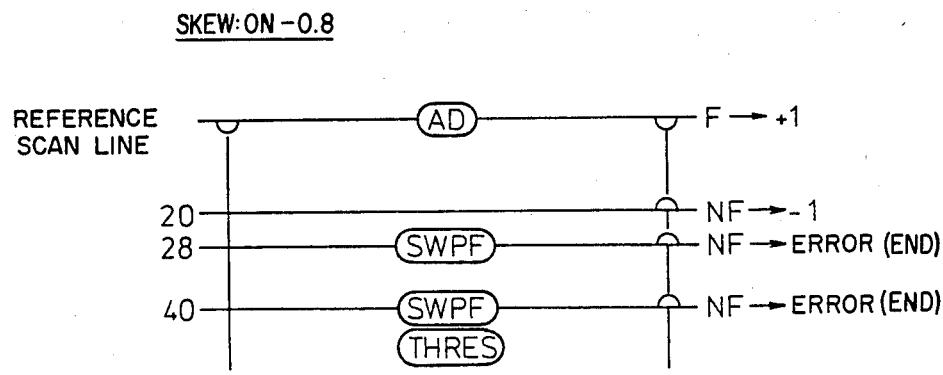

Processing operation is carried out according to the content of the mark row read start table (shown in Table 2) selected in the above initialization. The processing operation of Table 2 is shown in the flow sheet in FIG. 6, and also in the upper parts of FIGS. 4A and 4B. FIGS. 4A and 4B also shows the selection of scanning lines for the mark sheet.

Symbols used in FIG. 4A through FIG. 4J are described here. Lines in the horizontal direction show scan lines, and of the two lines perpendicular to them, the left line shows the position of the reference mark, and the right line shows the position of the skew mark. Next, the semicircle at the intersection of the scanning line and both marks is described. Although only one scan line is shown in this description for the ease of description, plural scan lines (e.g. four lines) are actually used as a group, and the group is considered as a single line. Among semicircles in the drawings, those above the scan line indicate that the upper half of scan lines of the plural lines are used and those below the scan line indicate that the lower half of scan lines are used said group of scan. In order to emphasize that the upper edge of the reference mark was detected, the intersection of the reference scan line and the left-hand line is shown with a black semicircle. The symbol F means that the skew mark has been found on the related scan line, and the symbol NF means that the skew mark has not been found. In the drawings, the symbol "AD" indicates the operation to compensate the variation of the distance between the reference edge of the sheet path and the left edge of the reference mark of the mark sheet due to the skew of the mark sheet, the symbol "SWPF" indicates the operation to obtain the count of PELs in each of all mark regions by scanning all the mark regions in a mark row, the symbol "THRES" indicates the operation for comparing the count of PELs of each of the mark regions with the threshold value and for storing the results of comparison, i.e., "mark absent" or "mark present". The symbol "SWPL" indicates the operation for scanning the user mark regions 1-18 in the left half of the mark row, and to obtain the count of PELs in each region, and the symbol "SWPR" indicates the operation for scanning user mark regions 19-36 in the right half of the mark row, and to obtain the count of PELs in each region.

Symbols "+1", "−1" and "ERROR" means control values pre-stored in the tables.

Figure 6:
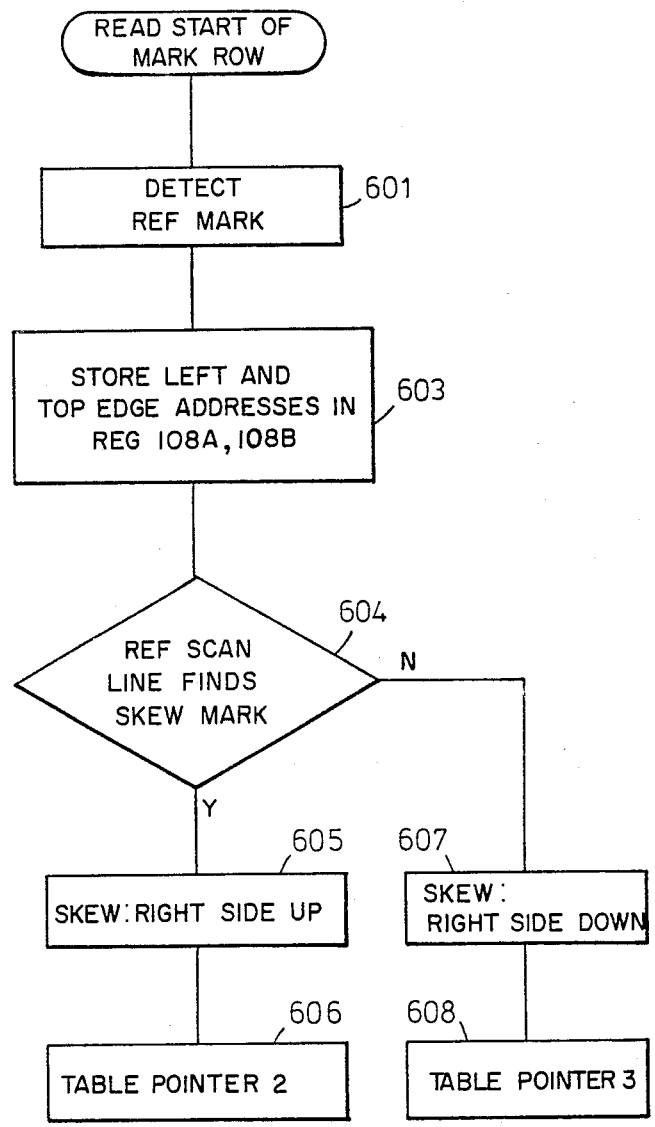
FIG. 6 is a flowchart showing the process operation with the mark row read starting table.

In the block 601 on FIG. 6, as the mark sheet travels across the optical detecting device 104 on the mark sheet path, the reference mark is searched. The search of the reference mark will be described later in detail referring to FIG. 12.

A certain search region of the mark sheet in which the reference mark region should be present is specified, and the presence or absence black PELs is checked in the search region. The search area is sufficiently large to allow operation with both A4 and letter size mark sheets. The output of the optical detecting device 104 is transmitted to the reference mark detecting circuit 108 through the A/D converter circuit 106 and the register 107. In the block 603, in FIG. 6, when a black region is detected in said search region, the black region is decided as the reference mark, the address of the left edge of the reference mark is stored in the sub-reference XS register 108A on FIG. 1A, and the address of the upper edge is stored in the sub-reference YU register 108B. This left edge address is the address of the optical sensor element which detected the black region, and the upper edge address is obtained by checking how many scanning lines are present from the edge of the mark sheet to the scanning line which detected the black region. The scanning line which detected the upper edge of the reference mark is the reference scanning line as described before.

As shown in the block 604 on FIG. 6 whether said reference skew mark has detected the skew mark is checked. This operation is made by the skew mark detecting circuit 109 on FIG. 1A. At this time, the addresses in the sub-reference XS register 108A and the sub-reference YU register 108B are transferred to and stored in the main reference XS register 100H and the main reference YU register 100C in the control device 100, respectively. This is performed for later use of these addresses as the reference for the following processes.

The block 604 on FIG. 6 is further described. If the skew mark is present, the skew of the mark sheet 102 is judged as right side up (block 605 and FIG. 4A), and the table pointer 2 is stored in the sub-skew register 100I and the process shown in Table 3 is continued (block 606). If the skew mark is not found, the skew of the mark sheet 102 is judged as right side down (block 607 and FIG. 4B), and the table pointer 3 is stored in the sub-skew register 100I, and the process shown in Table 4 is continued (block 608).

When the mark sheet is judged to have the skew of right side up, the control device 100 reads the Table 3 (FIGS. 7A through 7C), and operates as follows: Referring to FIG. 4A, the 52nd scan line from the reference scanning lines is selected (block 701). Then, it is determined if the skew mark has been detected by the 52nd scan line (block 702). If the skew mark is not detected, this sheet is judged as NOT MARK SHEET (block 703), and the operation is ended. If the skew mark is detected on the reference scan line, the skew mark detection circuit 109 generates the address signal of the first black region of the skew mark, or detects the position of the left edge of the black region, and stores it in the sub-skew XS register 109A (block 704).

Setting of Actual Scan Window Addresses by Correcting the Nominal Scan Window Address Based on the Deviation of the Optical System Before processing operations of Tables 3 and 4, the nominal scan window address in the storage device 101 on FIG. 1B is stored in the scan window address storage device 117 on FIG. 1A, and the nominal distance between the reference and skew marks in said storage device 101 is supplied to the compare circuit 112 of the compensation device 111 on FIG. 1A as the reference value.

In the case the optical system is kept correctly adjusted and no deviation is produced, and the mark sheet is the nominal one, the reference mark detection circuit 108 generates the address 112, shown in FIG. 2, and the skew mark detection circuit 109 generates address 1552. However, if the characteristics of the optical system is deviated from the nominal value due physical shock or others, the width of the incident image to the detecting array 104 may be enlarged or reduced according to deviation even if the standard or nominal mark sheet is used. Therefore, the address output of said both detection circuits 108 and 109 (FIG. 1) indicates the actual distance between the left edge of the reference mark and the left edge of the skew mark. This actual distance is larger or smaller than said nominal distance according to the deviation of the optical system.

Said both address signals detected are supplied to the compare circuit 112 of the compensation device 111 (FIG. 1). At this time, as described above, the nominal distance 1440 (5 mm×36×8) between the reference and skew marks is given to the compare circuit 112 from the storage device 101 as the nominal value. Said nominal distance indicates the nominal distance between the left edge of the reference mark and the left edge of the skew mark. The compare circuit 112 compares said nominal distance with the distance actually detected and outputs the distance difference signal $\Delta x_0$, due to the deviation of the optical system. From the compare circuit 112, only signal $\Delta x_0$ and the signal indicating its sign are generated. The compensation circuit 111 corrects said nominal scan window address stored in the scan window address storage device 117 and produces actual scan window address (block 707). These parts of the device 111, as described below, entirely distribute the distance difference $\Delta x_0$ over a scanning line as evenly as possible. The distance difference $\Delta x_0$ from the compare circuit 112 is supplied to the pitch select circuit 113. The signal indicating the sign of $\Delta x_0$ supplied to an output of the address update/control circuit 116 through the line 112A. This circuit 113 selects the pitch for the pitch accumulator 114 according to the distance difference $\Delta x_0$.

Therefore, the pitch accumulator 114 adds said pitch to the accumulator each time a clock pulse is impressed, and when the threshold is reached, the accumulator outputs the signal 1 on the output line 114A. The shift accumulator 115 increases the stored value from 0 by 1 in order each time the signal 1 is supplied on the output line 114A.

Figure 5:
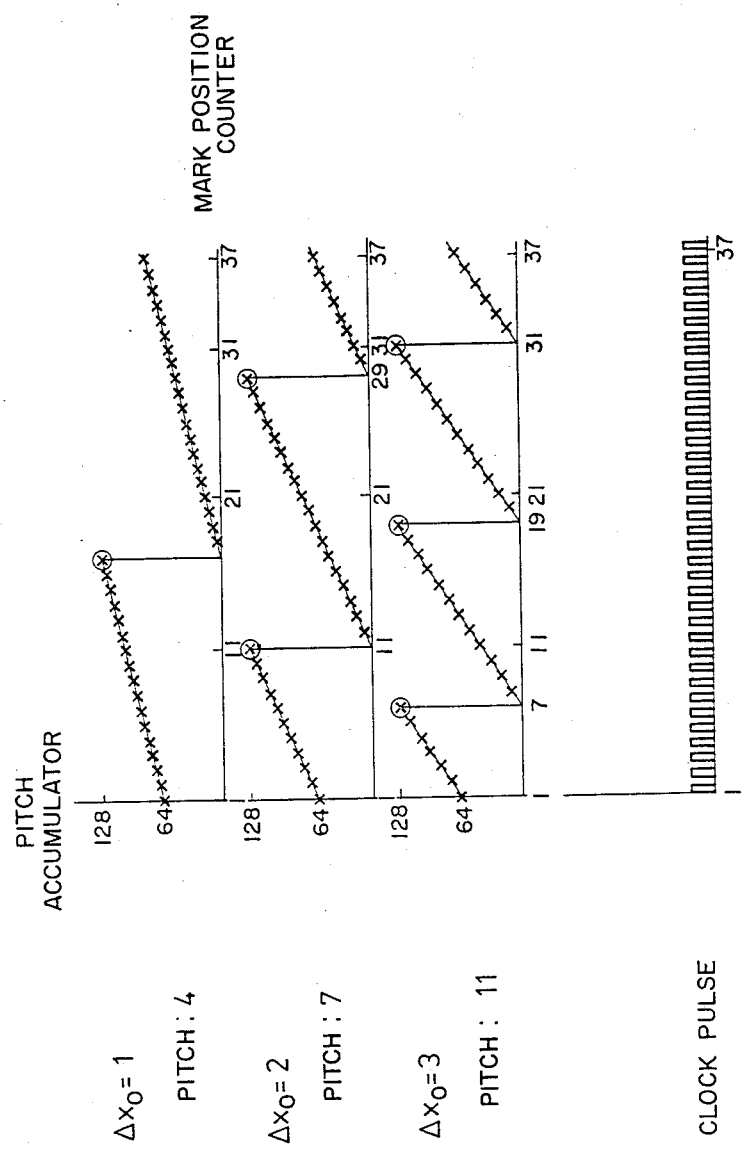
FIG. 5 is a chart showing the compensation for the deviation of the optical system according to this invention.

The output of the shift accumulator 115 is supplied to the address update/control circuit 116. This address correction is described referring to FIG. 5. The pitch accumulator 114 is a 128-stage counter, and this counter is initialized to the value 64. As shown in FIG. 5, it is assumed that the distance difference $\Delta x_0$ is set as $\Delta x_0=1$, $\Delta x_0=2$ and $\Delta x_0=3$, and the shift output of the pitch select circuit 113 is 4 when $\Delta x_0=1$, 7 when $\Delta x_0=2$, and 11 when $\Delta x_0=3$. The clock pulse source 118 generates clock pulses corresponding to the number of marks, 37. When $\Delta x_0=1$, the pitch accumulator 114 increments by 4 for each clock pulse, and when 16th clock pulse is impressed, the accumulator reaches the end value, 128, and produces an output by which the shift accumulator 115 stores 1, which is impressed to the address update/control circuit 116. This address update/control circuit 116 sequentially reads the nominal scan window addresses in the scan window address storage device 117 in order, each time a clock pulse is impressed, and modifies it if required. That is, for clock pulse 1, the circuit reads the nominal scan window address of the reference mark which is the first mark, and for clock pulse 2, the circuit reads the address, 152 of the first user mark region, or the second mark region. This circuit 116 modifies the address read by the number which is given by the shift accumulator 115, and rewrite the address into the scan window address storage circuit 117. In the case of $\Delta x_0=1$, the content of the shift accumulator 115 is 0 until the timing pulse #16 (the 16th mark region) is supplied, and therefore, the scan window addresses up to the 16th mark region are not modified. After the 17th timing pulse, the output of the shift accumulator 115 becomes 1, and consequently, the nominal scan window addresses after 17th timing pulse is increased by 1. Thus, the scan window addresses for the required mark regions of the mark address storage circuit 117 are modified.

In the case of $\Delta x_0 = 2$, the nominal scan window addresses for 11th through 28th mark regions are increased by 1, and the nominal scan window addresses for the regions after the 29th mark region are increased by 2. In the case of $\Delta x_0 = 3$, 1 is added to nominal scan window addresses for 7th through 18th mark regions, and 2 is added to nominal scan window addresses for 19th through 30th mark regions, and 3 is added to nominal scan window addresses for the regions after 31st mark region.

As described above, the nominal scan window addresses in the mark address storage circuit 117 is modified so as to compensate the deviation of the optical system. These new addresses are actual scan window addresses.

Although compensation for such deviation of the optical system that the enlarged distance between 1st and 37th mark regions is projected to the optical detecting device was described above, such deviation that the reduced distance is projected to the optical detecting device can similarly be compensated. In order to distinguish the enlargement or the reduction, the compare circuit 112 produces the sign of the distance difference $\Delta x_0$, + or − signals, to the address update/control circuit 116. The + signal shows enlargement and the − signal shows reduction. In this manner, the device 116 corrects nominal scan window addresses of the mark regions according to the enlargement or the reduction and to the degree of deviation, and provides the corrected addresses to the scan window address storage device 117.

Figure 7A:
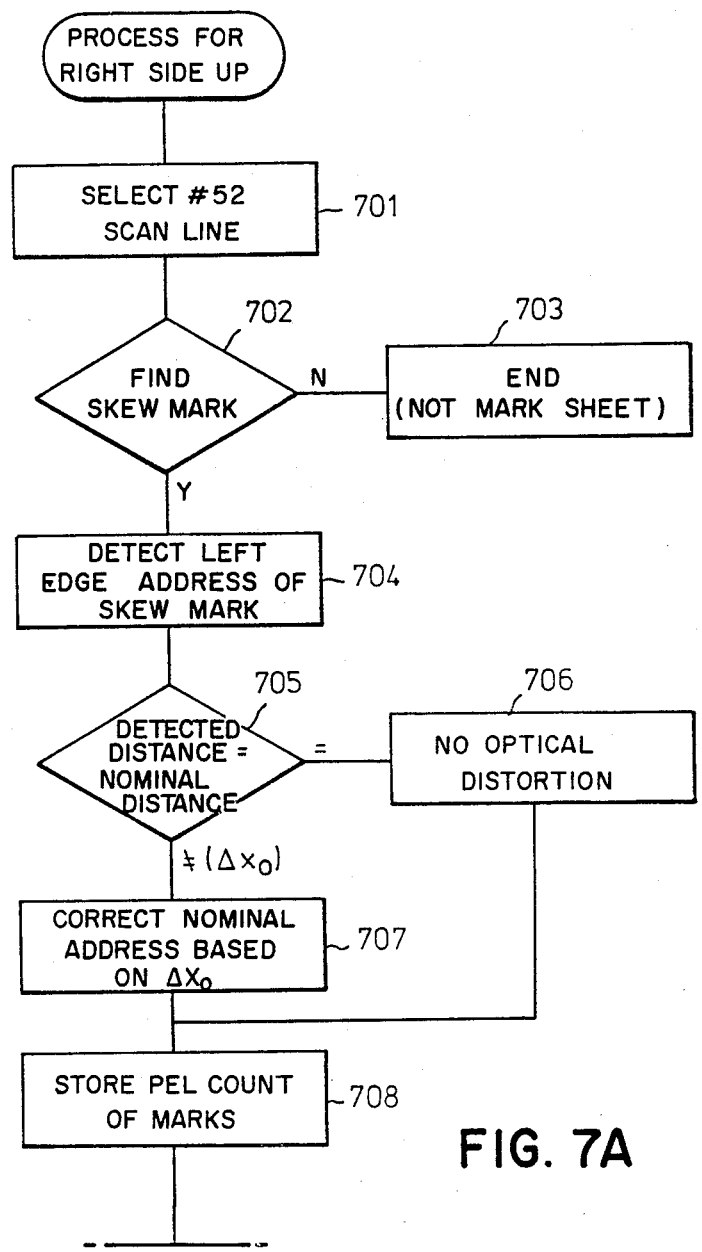
FIGS. 7A, 7B and 7C are flowcharts showing the process operation of the mark row process (right side up) tables.

Referring again to block 707 in FIG. 7A, during the address correction, the feed of the mark sheet is stopped, and all image data of horizontal corresponding addresses 0 through 1679 or the mark sheet are stored in the buffer register 119 in FIG. 1A.

Read of First Mark Row

Figure 7B:
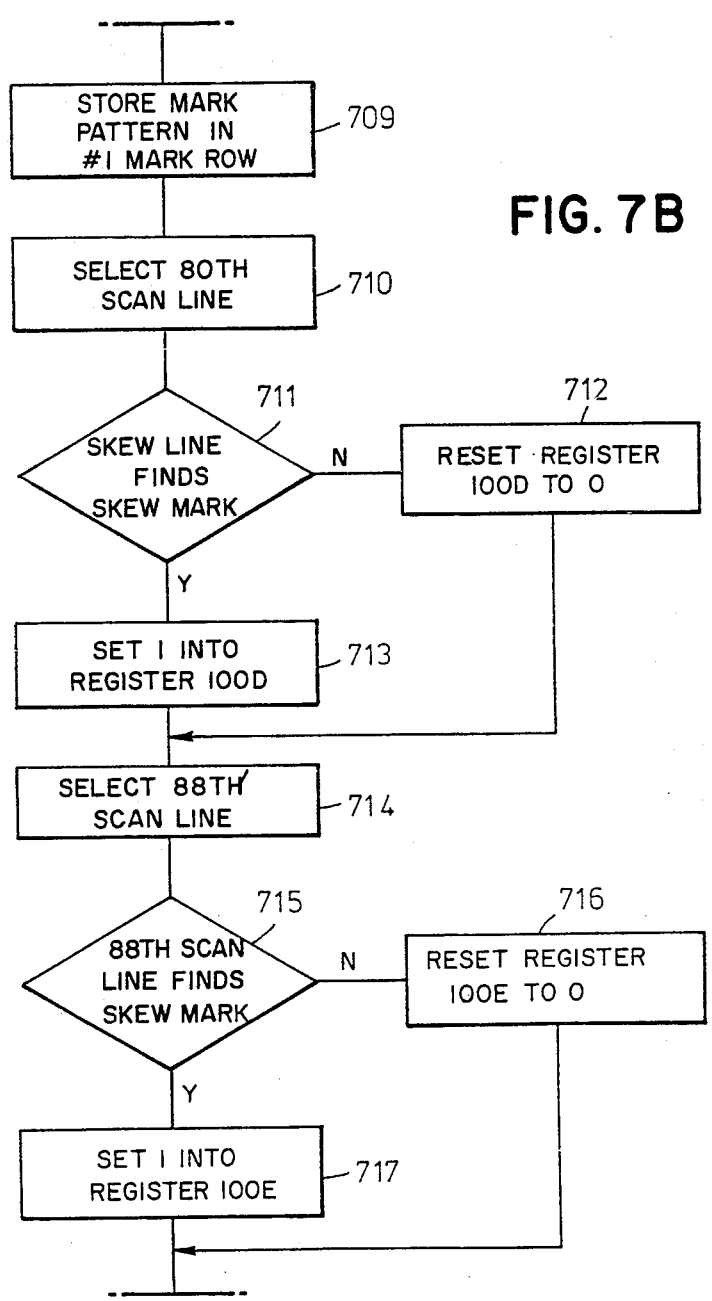

The decoder control device 100A scans the register 119 by using actual scan window addresses, and the image data, mark patterns and mark row number fields of all of 37 mark regions are stored in the register 100F (block 708, and block 709 on FIG. 7B). The data stored in this register 100F represents the mark patterns on the mark sheet.

Detection of Skew Angle of the First Mark Row

Next, the 80th scan line is selected (block 710 on FIG. 7B). Then the presence of the skew mark on this scan line is checked (block 711). If the skew mark is detected, the first skew flag register 100D of the control device on FIG. 1B is set to 1, and if the skew mark is not detected, this first skew flag register 100D is reset to 0 (blocks 713 and 712). Next, the 88th scan line is selected (block 714). Whether or not the scan line has detected the skew mark is checked, and if the skew mark is detected, the second skew flag register 100E is set to 1, and if the skew mark is not detected, this second skew flag register 100E is reset to 0 (blocks 715, 716 and 717).

Figure 7C:
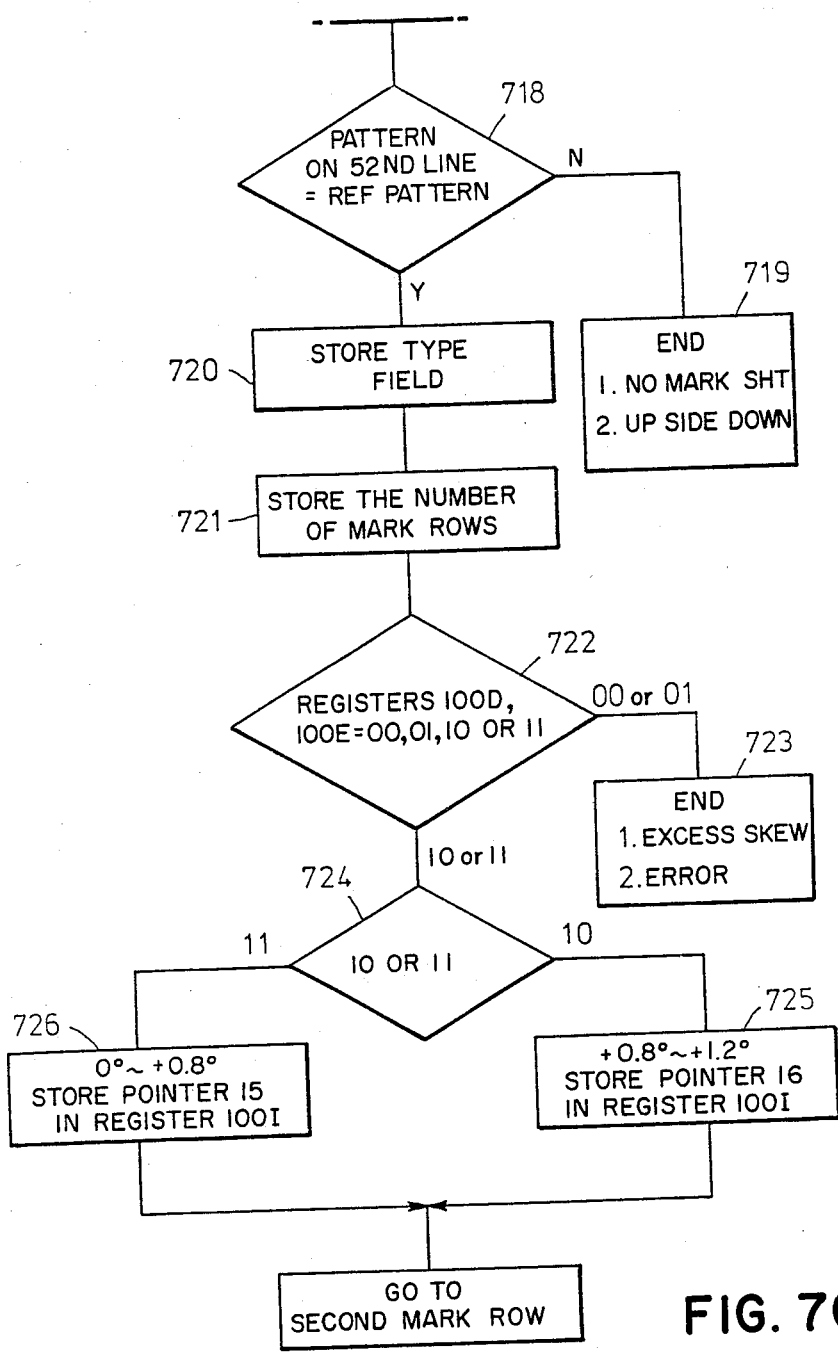

Next, in block 718 in FIG. 7C, the equality of the mark pattern of the mark sheet stored in said register 100F with the reference pattern is checked. This reference mark pattern has been fetched from the storage device 101 to the register 100G under the control of the decoder control device 100A, and the contents of the registers 100F and 100G are checked. If both mark patterns are not equal with each other, this sheet is judged as NOT MARK SHEET or the mark sheet has been fed bottom edge first, and mark sheet processing operation is ended (block 719).

Referring to the decision of said block 718, the operations of the data compression device 121 and the buffer register 122 on FIGS. 1A and 1B, and the transmission of compressed data are described here. The block 103 on FIG. 1A supplies the digital image data of all the addresses of the sheet from the top to the sheet, to the data compression device 121 irrespective to whether the sheet being read is a mark sheet or a document sheet and data compression is made. The compressed data are stored in the buffer register 122.

The example in the description assumes that the first sheet is the mark sheet. Therefore, if the sheet being read is judged as NOT MARK SHEET, the compressed data is said buffer register 122 are ignored and are not transmitted, and the register is reset. When the document sheet for transmission following the mark sheet is read, the image data of all the addresses from the start of read of the document sheet are transmitted to the data compression device 121, the compressed data are stored in the buffer register 122, and the decision operation of said block 718 is made in parallel. Since the document sheet does not become equal to the reference mark pattern in block 718, the process operation for the mark sheet is ended (block 719), and the sheet being read is judged as a document sheet, and the transmission of the compressed data in said buffer register 122 is started. That is, the decoder control device 100A in FIG. 1B does not transmit the data from the register 122 in the case of that the first sheet reaches the block 719, and allows the transmission of the compressed data from said buffer register 122 in the case of that the sheet is the second sheet and the following sheets reach the block 719.

The mark of the mark sheet which has been sensed is checked by the mark process device 127 in FIG. 1B to determine "mark present" or "mark absent", and data indicating the result is supplied from this mark process device 127 to the transmission line through the transmission adaptor (not shown in the drawing).

Referring again to block 718 in FIG. 7C, the mark pattern which indicates that the sheet is the mark sheet, could be specified by so defining that some of the 35 mark regions in the first mark row are black. For example, it can be specified that the sheet is a mark sheet, if 4th, 5th, 8th, 12th, 13th, 16th, 17th, 20th, 21st, 28th, 29th, 32nd and 33th mark regions are black.

Referring now to FIG. 2, the description of the first mark row is continued. Among 1st to 35th mark regions following the reference mark, the 1st to 23rd mark regions for example, could be used as the field for the mark patterns, the 24th to 28th mark regions could be used as the type field, and the 29th to 33rd mark regions could be used as the count field to verify the number of mark rows. The 28th mark region in the type field is used to identify whether this mark sheet is the first or the second mark sheet when two mark sheets are successively scanned prior to the document sheets to be transmitted. Since the mark sheets are used as partitions of preceding document sheets it is necessary when two mark sheets are successively scanned, to distinguish the first mark sheet, which serves as the partition, from the other mark sheet which does not serve as the partition. Therefore, the above identification is made. When the 28th mark region is marked in black, the sheet is judged as the first mark sheet, and when the 29th mark region is marked in black, the sheet is judged as the second mark sheet. Therefore, block 720 is for extracting data for identification.

In block 720 in FIG. 7, the type field is stored in the fixed position of the storage device from the register 100F. In block 721, the data of the verification count field of 29th to 33rd mark regions of the first mark row is extracted. This field indicates the number of user mark rows on the mark sheet. User rows are counted beginning with row 2. In block 722, the contents of first and second skew flag registers 100D and 100E are checked. If the data is both registers is 00 or 01, the mark sheet process procedures is terminated since the mark sheet is skewed excessively or due to a misprint the center portion of the skew mark is left white (block 723), If the data is 10 or 11, it is further examined in block 724, and if it is 10, the skew is judged as +0.8° to +1.2° right side up (block 725), and if it is 11, the skew is judged as 0° to +0.8° right side up, and the result is stored in the sub-skew register 100I with table pointers in Table 1 described above. Then, the second mark row is processed.

In the process operation according to the mark row read start table described with referring to FIG. 6, if the mark sheet is judged to have skew of right side down (block 607), the table pointer 3 is given to the skew register 100B and the mark row process (right side down) table is read by the control device 100A. FIGS. 8A through 8C and 4B show operations according to the content of this table. In block 801 on FIG. 8A, the 20th scan line is selected. Then whether the 20th scan line has detected the first skew mark is checked (block 802). If the first skew mark is not found, the first skew flag register 100D is reset (block 803). If the first skew mark is found, the first skew flag register 100D is set to 1 (block 804). Next, the 28th scan line is selected (block 805). Whether this scan line has detected the first skew mark is checked (block 806). If the first skew mark is not found, the second skew flag register 100E is reset (block 807), and if the first skew mark is found, this register 100E is set to 1 (block 808). Then, the 52nd scan line is selected (block 809). In block 810 in FIG. 8B, whether this scan line has detected the first skew mark is checked. If the first skew mark is not found, the sheet is judged as NOT MARK SHEET and the operation is ended (block 811). If the first skew mark is found, the operations of blocks 810 through 817 are executed. Since this is the same as blocks 702 through 707 on FIG. 7A, description is not made.

Figure 8A:
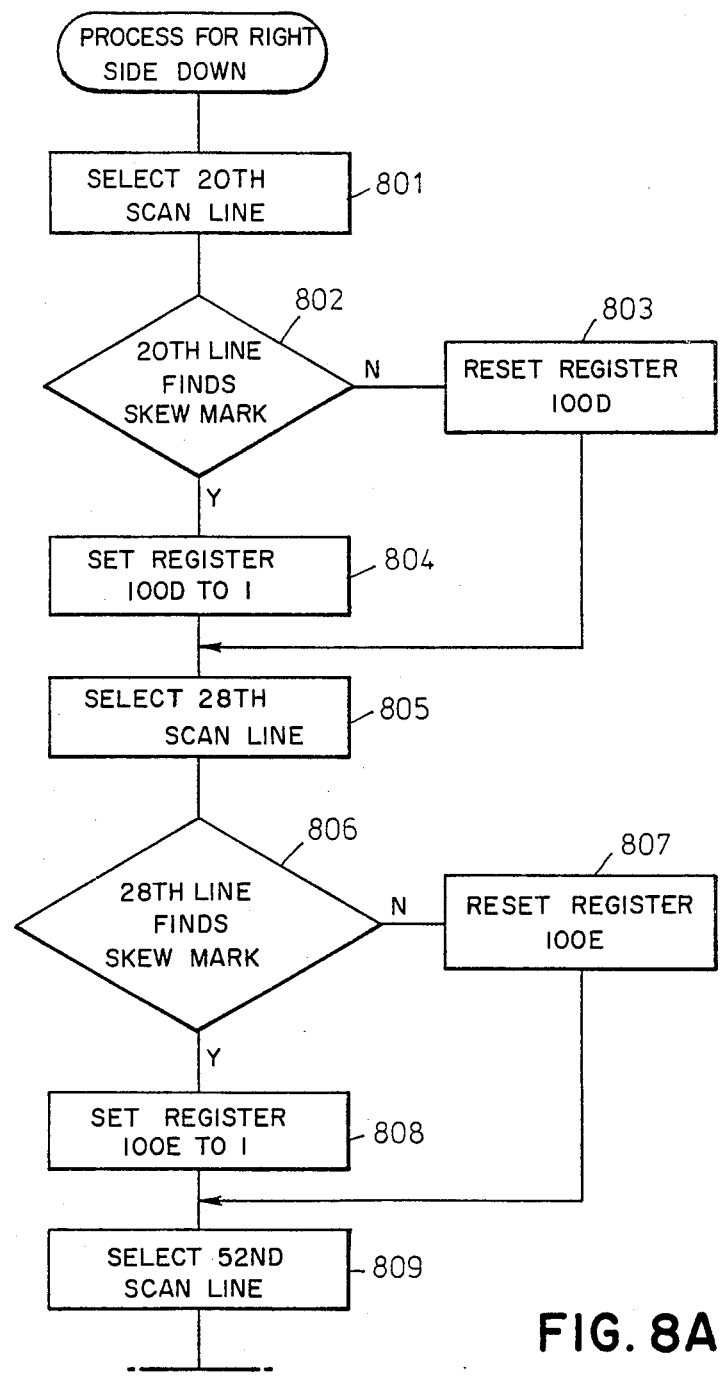
FIGS. 8A, 8B and 8C are flowcharts showing the process operation of the mark row process (right side down) tables.
Figure 8B:
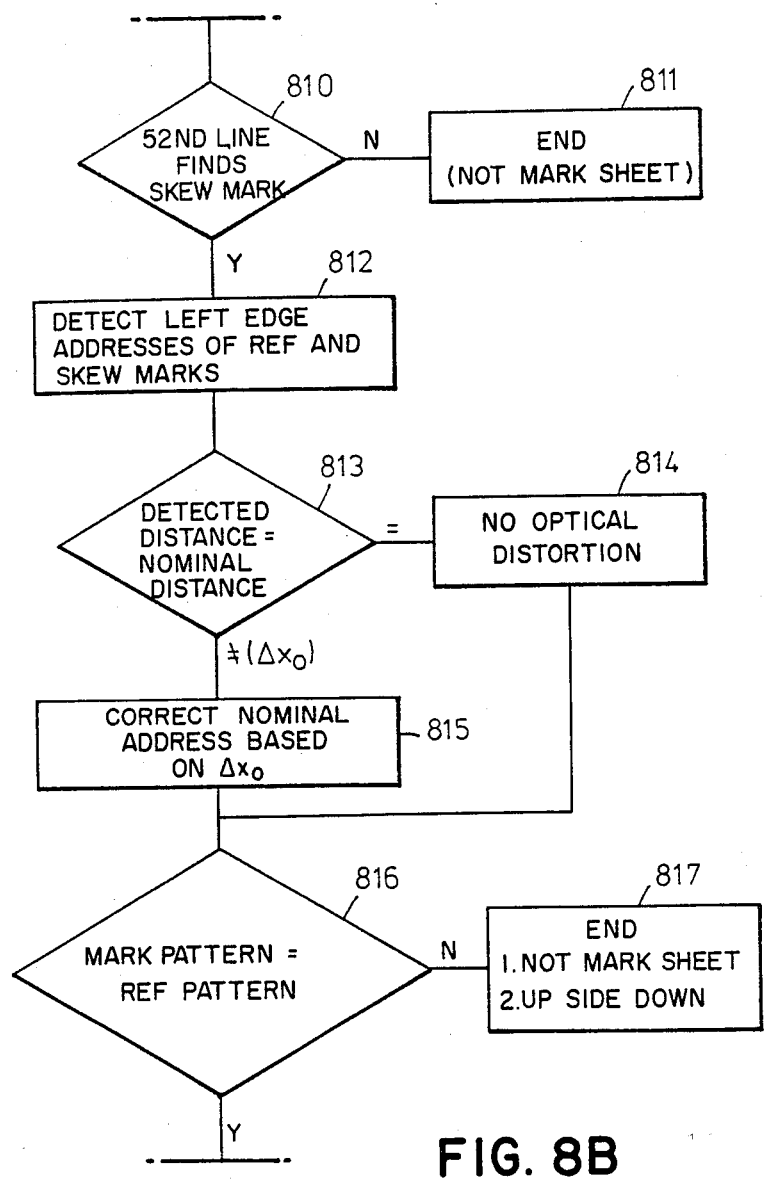
Figure 8C:
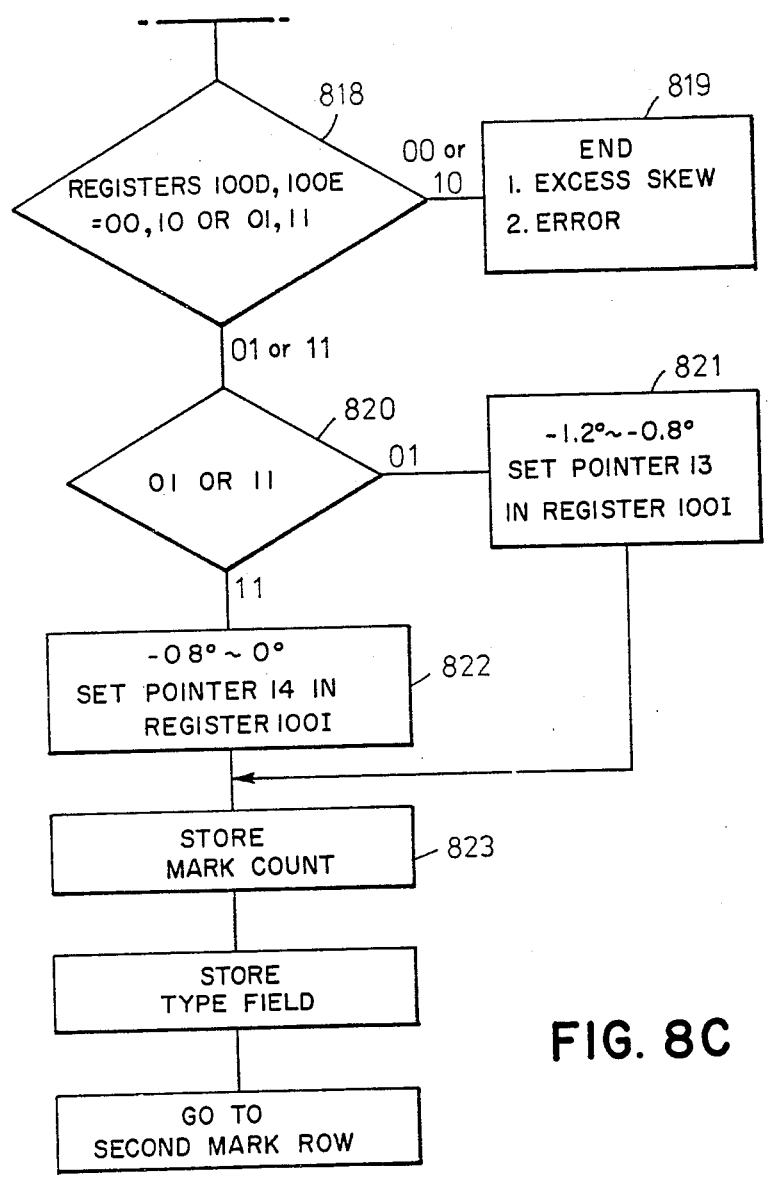

In block 818 in FIG. 8C, the values of the first and second skew flag registers 100D and 100E are checked. If the value is 00 or 10, the operation is ended with alarm, etc. When the value is 10, it shows the error that an inside of the skew mark is left white due to misprinting, so that the sheets with misprinting are removed. When the value is 01 or 11, the value is rechecked (block 820). If it is 01, the skew of the mark sheet is judged to be right side down in the range of −0.8° to −1.2°, and if it is 11, the skew is judged as −0° to −0.8° right side down (blocks 821 and 822).

The result is stored in the sub-skew register 100I. It is noted, in blocks 722 through 726 on FIG. 7C showing the process operation of Table 3 and blocks 818 through 822 on FIG. 8C showing the process operation of Table 4, that a new table pointer of the table for processing the second mark row is selected and stored in the sub-skew register 100I. The selection of this new table pointer is made by the decoder control device 100A based upon the table pointer of the preceding tables in the main skew register 100B, and the data of the first and second skew flag registers 100D and 100E.

As described above,
(a) the decision whether the sheet is a mark sheet,
(b) the establishment of actual scan window addresses by the modification of nominal scan window addresses for compensating the deviation of the optical system from the adjusted value,
(c) the decision whether the initial skew of the mark sheet is within the allowable range (the range of 0° to +0.8°, right side up, the range of +0.8° to +1.2°, right side up, the range of 0° to −0.8°, right side down, and the range of −0.8° to −1.2°, right side down), and
(d) the decision which allowable range the skew of the mark sheet corresponds to
were made.

Furthermore, the type field in the first mark row was checked to find that the mark sheet is the first or second mark sheet, and the number of mark rows contained in this mark sheet, which is indicated by the verification count data, was decoded. Therefore, the second mark row, or the user mark row will next be processed.

Process Operation of User Mark Row

In the process of the second mark row and following mark rows, one of eight skew range tables is selected according to the skew range detected in the process of the first mark row. Operations common to the eight tables are as follows:
(a) The distance between the left reference edge of the sheet path and the left edge of the reference mark of the mark sheet is measured, and the detected distance is compared with the distance between the left-hand reference edge of the sheet path and the left edge of the reference mark is the preceding mark row, and the distance difference, $\Delta x_s$ is obtained. This distance difference $\Delta x_s$ is caused by the shift of the mark sheet in the row direction. Note the distance difference $\Delta x_0$ described above is the deviation from the nominal distance, which is caused by the deviation of the optical system, etc.
(b) The actual scan window address of said preceding mark row (the address modified according to $\Delta x_0$) is further modified based upon $\Delta x_s'$ and the actual scan window address of the present mark row is set into the scan window address storage device 117.
(c) The presence or absence of the mark in the user mark regions is checked using the actual scan window address of this mark row.
(d) The reference mark region of this mark row and the second skew mark region is checked when said user mark region of the second mark row is scanned, and the skew of the mark sheet is determined at the process of the present second mark row.

In the example description, eight skew ranges, i.e. four ranges for right side up skew and four ranges for right side down skew are established for the second and remaining mark rows. However, in processing the first mark row, only mark sheet skewed within four skew ranges are continued. Namely, the processing of mark sheets within the ranges of 0° to +0.8°, right side up, +0.8° to 1.2°, right side up, 0° to −0.8°, right side down and −0.8° to −1.2°, right side down are allowed. Mark sheets having greater skew than the above ranges are eliminated as excessively skewed sheets and processing is discontinued. The reasons for this is that the angle of skew may increase while the mark sheets are fed. Processing of the mark sheets is stopped if the initial skew of the mark sheet against the detecting array is large from the beginning (e.g., if the skew is within the ranges of 1.2° to 2.0° right side up or right side down).

Based upon the skew range detected for the preceding mark row, which range of the above eight ranges is to be selected is determined. For instance, if the skew of the first mark row is within the range of 0° to +0.8°, right side up, the skew range table of this 0° to +0.8° range is selected by the table pointer 15 (see Table I) to show this range for the scan of the second mark row. Then, the scanning line for the next mark row is selected according to the skew range of the preceding mark row.

In the process of the first mark row, assumption is made that the mark sheet skew 0° to +0.8°, right side up, the table pointer 15 (see Table I) is stored in the sub skew register 100I.

Based on said table pointer 15, the selection of the new table (Table 9) is made by the table address process described below by referring to FIG. 9.

Figure 9:
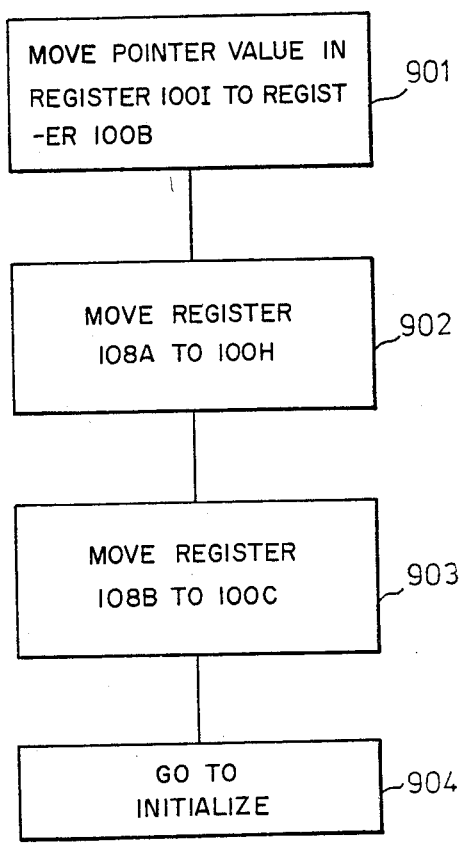
FIG. 9 is a flowchart showing the process operation of the post process.

In block 901 in FIG. 9, since the newest skew range obtained in the mark row which was already processed has been set into the sub-skew register 100I, it is transferred to the main skew register 100B. Next, in block 902, data in X and Y directions to the upper left of the reference mark detected in the process of the preceding table, i.e., the sub-reference XS register 108A and the sub-reference YU register 108B are written in the main reference XS register 100H and the main reference YU register 100C, respectively (blocks 902 and 903). Since the preparation for the process of next table has been made by this, the initialization is made again. In the initialization program routine, as described above, using the table pointers stored in the main skew register 100B, the corresponding table, i.e., the table for processing 0° to +8°, right side up (Table 9) is read by the decoder control device 100A through the register 100G and the address device 100M, and the operation is controlled by the table.

Setting of Actual Scanning Line Address for Second Mark Row

Figure 4G:
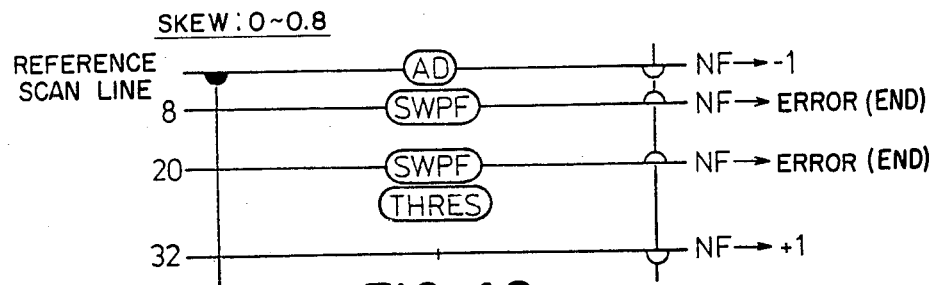
Figure 4H:
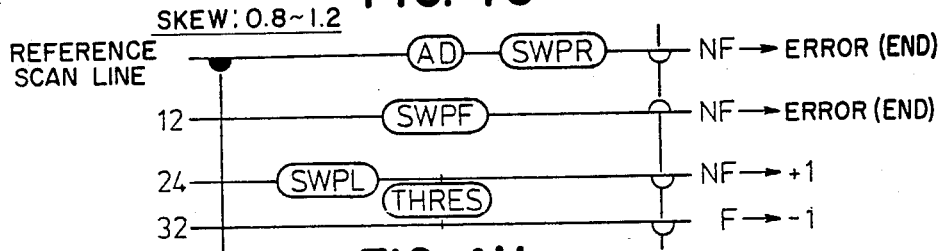
Figure 4I:
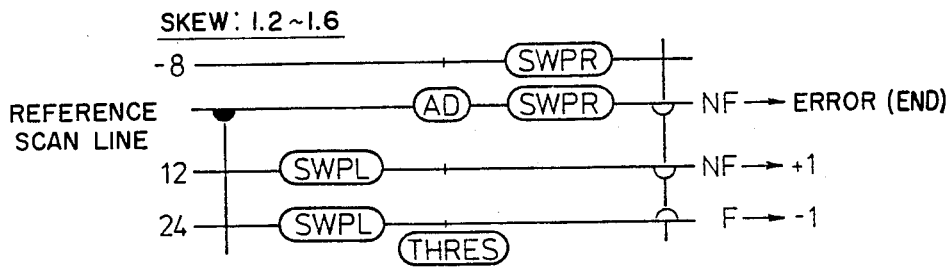
Figure 4J:
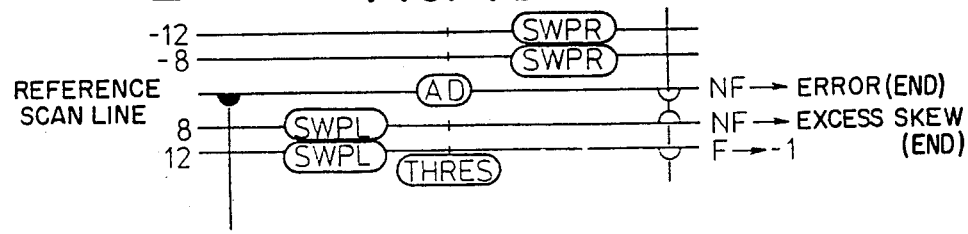
Figure 10A:
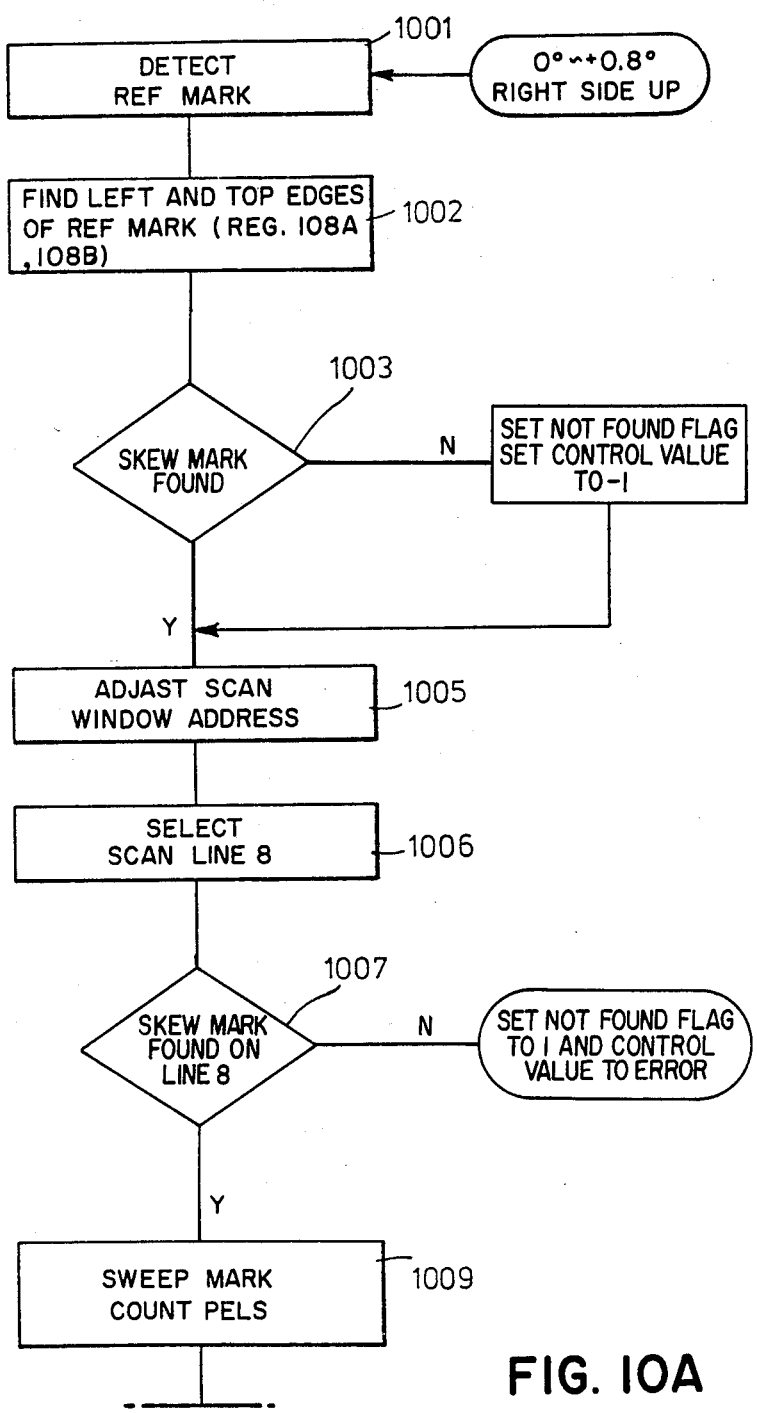
FIGS. 10A and 10B are flowcharts showing the 0° to +0.8° (right side up) table.
Figure 10B:
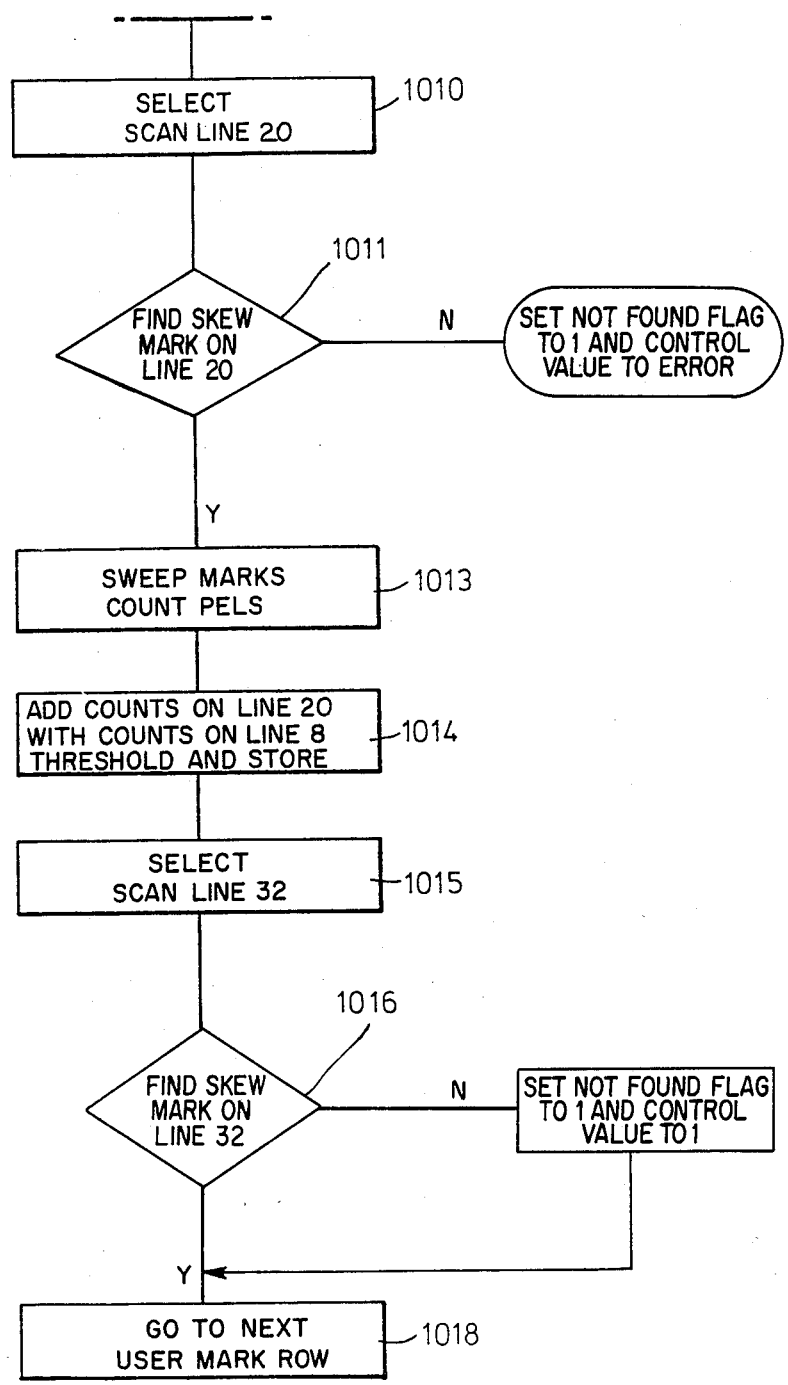

The process operation according to the above table on Table 9 is described referring to flowcharts in FIGS. 10A and 10B, and FIG. 4G.

Referring to FIGS. 10A and 10B, the reference mark is detected (block 1001). Reference mark detection will be described later referring to FIG. 12. In this detection, the address of the left edge of the reference mark is stored in the sub-reference XS register 108A in FIG. 1, and the address of the scan line which found this reference mark first, i.e., the reference scan line, is stored in the sub-reference YU register 108B in FIG. 1A (block 1002). Next, whether the skew mark was detected is checked. If the result is "no", the amount of skew range shift is set to −1 (block 1004). This amount of skew range shift is used in selecting skew range for the next mark row. This skew range shift will be described later. Next, in block 1005, the actual scan window address of preceding mark row is updated. The detected address of the left edge of the reference mark is supplied to the compare circuit 112 in FIG. 1, and this address is compared with the address in the main reference XS register 100H. Note that the address of the left edge of the reference mark on the preceding mark row has been stored in the main reference XS register 100H as described before. By this comparison, the shift of the left end of the reference mark on the second mark row caused by the shift of the mark sheet in moving from the first to the second mark row is checked. By this comparison, the compare circuit 112 generates an output $\Delta x_s$. At this time, the output $\Delta x_o$ is not generated. The output $\Delta x_s$ and the signal indicating its sign are supplied to the address update/control device 116 through the line 112B, and this device 116 shifts the actual scan window address of the preceding mark row stored in the scan window address storage device 117 in accordance with the amount and direction of modification of the left edge of the reference mark, and creates the actual scan window address for this mark row. The mark regions in the second mark row are scanned by the actual scan window addresses which have been compensated, or modified, for both the actual scan window address, or the deviation of the optical system and the shift of the mark sheet due to skew. By updating the scan window address of the mark region, the accuracy of reading the mark regions is markedly improved.

Referring again to block 1006 on FIG. 10A, scan line 8 is selected, and it is determined if the skew mark is detected on this scan line. If it is not detected, this is judged an error and the operation is ended (block 1008). In block 1007, when the skew mark is detected, all the mark regions are checked for marks (block 1009). Next scan line 20 is selected (block 1010 on FIG. 10B), and it is determined if the skew mark is detected (block 1011). If the skew mark is not detected, the operation is ended (block 1012). When a skew mark is detected, the number of PELs in each mark in all the mark regions are counted (block 1013), the count is added to the count scaned during the scan of line 8, the sum is compared with the threshold, and the results are stored as mark detection signals, which are supplied to the mark process device 127 (block 1014). Next, scan line 32 is selected (block 1015), and whether the skew mark was detected is checked (block 1016). If the skew mark is not detected, the skew range shift is set to +1. Thus, processing of the second mark row is completed, and the next user mark row, or the third mark row, is processed (block 1018). The skew range shift designates how much the table pointer of the skew range in the preceding mark row is to be modified. The flowcharts on FIGS. 10A and 10B show only the table of 0° to +0.8° right side up (Table 15), one of the eight skew ranges. Since the operations for other seven skew range tables are obvious from Tables 5 through 8, Tables 10 through 12, and the operational diagrams on FIG. 4, these are not shown. The compensation for the shift of the reference mark which might be caused by the shift of the mark sheet due to skew or other reasons, i.e., the modification of the actual scan window address, which is made according to Table 9 described above is also made for the process operations of the other seven skew range tables.

Next, the circuit for setting the skew range is described. The skew range control device 100L in the control circuit 100 in FIG. 1B sets the new skew range for the process of the next mark row. This circuit 100L is operated only when second and succeeding mark rows, i.e., the user mark rows, are processed.

The details of this control circuit 100L are shown in FIG. 11A. Referring to FIG. 11A, the control circuit 100L comprises two AND circuits 150 and 151, an OR circuit 153 to which the outputs of the AND circuits are applied, a compare circuit 154 to which the output line of the OR circuit 153 is applied, and an arithmetic circuit 156 to which the output line from the compare circuit 154 is applied. The inputs to these AND circuits 150 and 151 are connected to the skew mark detection circuit 109 and the decoder control circuit 100A, respectively. The input of the control value register 155 is connected to the decoder control circuit 100A. The other two inputs to the compare circuit 154 are connected to the main skew register 100B and the sub skew register 100I, respectively. To the other two inputs of the arithmetic circuit 156 are also connected to the output of the control value register 155 and the output of the sub skew register 100I, respectively. The output of the compare circuit 154 is connected to the error handling circuit 100J.

The setting of skew range shift in the process of the 0° to +0.8° (right side up) table described referring to Table 9 and FIGS. 4G, 10A and 10B is described. At the selection of this table, the skew range of this table, i.e. the table pointer 15, is stored in the main skew register 100B. On the output lines 150A and 151A of the decoder control device 100A, an up level or down level signal is produced according to the set conditions of the two flags, i.e. the found flag and the not-found flag (stored in the process table for the 0° to +0.8°, presently used) shown by blocks 1003, 1007, 1011 and 1016 on FIGS. 10A and 10B. When the found flag is set to 1, the signal on the line 150A is in the up level.

On the output line 151A of the control device 100A, a signal is produced in accordance with the set condition of said not-found flag. When the not-found is set to 1, the signal on the line 151A is in the up level. The skew mark detection circuit 109, produces the signal of the up level on the line 150B, when it detects the skew mark. The circuit 109 produces the up level signal on the line 151B when it does not detect the skew mark. The control values, as shown in the blocks 1004, 1008, 1012 and 1016 in FIGS. 10A and 10B, have also been stored in the table together with said flags, and are stored into the control value register 155 from the decoder control circuit 100A through the line 155A according to the progress of operations. The process operations are described with referring to FIGS. 10A and 10B. In block 1004 on FIG. 10A, since the not-found flag has been set to 1, the signal on the line 150A is in down level, and the signal on the line 151A is in up level. In block 1004, the control value $-1$ is specified, the value $-1$ is set in the control value register 155 through the line 155A. At this time, the table pointer 15 of this table has been stored in the main skew register 100B, as described above. Said table pointer 15 now stored in the main skew register 100B is also maintained in the sub skew register 100I when the process of the preceding mark line was completed, and therefore, "15" has been stored in both registers 100B and 100I. When the skew mark was not detected in block 1003 on FIG. 10A, the outputs on lines 150A and 150B are in down level, and the AND circuit 150 is not conditioned, and therefore, the output 150C is in down level. On the other hand, since the skew mark was not detected, the signal on the line 151B is in up level, and since the not-found flag line 151A is in up level, the AND circuit 151 is conditioned, and it produces the up level signal on the output 151C, which is applied to the compare circuit 154 through the OR circuit 153. The up level signal on the output line 153A of this OR circuit 153 is the signal for triggering the compare operation of the compare circuit 154, and in this case, the compare circuit 154 compares the content of the main skew register 100B with the content of the sub skew register 100I.

When the contents of both registers are equally 15, the compare circuit 154 produces a signal energizing the arithmetic circuit 156 on the line 154D among the lines 154C and 154D. Whereby, the arithmetic circuit 156 adds the content, i.e. 15, of the sub skew register 100I, to the control value, i.e. $-1$, in the control value register 155, and stores the resultant value 14 into the sub-skew register 100I. Note that the table pointer indicating the skew range is changed from 15 to 14, at this time. If the skew mark is detected in box 1003, the line 150B is in up level, but since the line 150A is in down level, the AND circuit 150 is not conditioned, and the AND circuit 151 is also not conditioned because its input 151B is in down level. Therefore, both AND circuits 150 and 151 do not generate up level signal, and consequently, the OR circuit 153 does not output the compare circuit trigger signal, and the operation is ended, the range, or the table pointer, is not altered (remaining 15), and the operation proceeds from block 1005 to block 1007 in FIG. 10A.

If a skew mark is not detected in block 1007, the line 151B is in up level and the line 150B is in down level. The found flag line 150A is set to the down level, the not-found flag line 151A is set to the up level, and the error value "80" is stored in the control value register 155. Therefore, the output line 151C of the AND circuit 151 becomes up level and the compare circuit trigger signal is applied to the compare circuit 154 through the OR circuit 153. Previously, the skew range value, i.e., the table pointer 14, has been stored in the subskew register 100I as described above, and the skew range value, or the table pointer, in the main skew register 100B is still 15. Since these values are not equal to each other, the compare circuit 154 generates the up level signal only on its output line 154C, and indicates the occurrence of error to the error handling circuit 100J to allow such necessary measures as energizing the error indicator lamp and the discharge of mark sheets, etc.

The probable reason scan line 8 did not detect the skew mark even though this mark sheet was determined to be right side up is the presence of a preat flow in the skew mark region, which shows that the reliability of the mark sheet is low, and therefore, the operation is terminated.

If a skew mark is detected in block 1007 on FIG. 10A, the line 150B on FIG. 11A is in up level, and the detection flag line 150A is in down level, and the AND circuit 150 is not conditioned. The AND circuit 151 is also not conditioned because the line 151B is in down level. Therefore, the compare circuit trigger signal is not produced, and the operation proceeds to block 1009 in FIG. 10A. Note that the content of the skew register 100I is 14.

Next, block 1012 on FIG. 10B is described. According to the set condition here, the found flag line 150A is set to the down level, and the not-found line 151A is set to the up level. If the skew mark is not detected, the line 151B is in up level, and the AND circuit 151 is conditioned and produces the compare circuit trigger signal through the OR circuit 153. Since the skew range value, or the table pointer, in the main skew register 100B is 15, while the value in the sub skew register 100I is 14, the compare circuit 154 produces the up level signal on the line 154C, and energizes the error handling circuit 100J on FIG. 1B.

Next, referring to blocks 1016 and 1017 on FIG. 10B, if a skew mark is not found on line 32 the not-found flag line 151A is set to the up level and the found flag line 150A is set to the down level. The control value register 155 is set to the value +1. If the skew mark is not detected, the output line 151B is in the up level, and the AND circuit 151 is conditioned and produces the compare circuit trigger signal through the OR circuit 153. Whereby, the compare circuit 154 compares the contents of the sub skew register 100I (skew range value, or the table pointer 14) and the main skew register 100B (skew range value, or the table pointer 15). Since the result of this comparison is NOT EQUAL, the compare circuit 154 outputs the up level signal on the output line 154C, and energizes the error handling circuit. If the skew mark is detected, the up level signal is produced on the line 150B, and the down level signal is produced on the line 151B, both AND circuits 150 and 151 are not conditioned, and therefore, the further operations are continued, and the skew range value, or the table pointer, in the sub-skew register 100I is maintained at 14.

Summarizing the above operations; in the process of the preceding mark row, the skew of the mark sheet was found to be 0° to +0.8° (right side up), and the skew range, or the table pointer 15, was selected, and the table described above (Table 9) was selected for the process of the present mark row. Using this table, the present mark row was processed, and the skew was checked. As the result, the skew range value, or the table pointer, was changed to 14, and this value has been maintained in the sub-skew register 100I. In the process of selecting the table address for processing the next mark row, the content of the sub-skew register 100I is written to the main skew register 100B, and using this skew range, table pointer 14, newly set, table 8 for processing the next mark row is selected. This new table 8 is for 0° to −8° (right side down). During the mark reading process for the present mark row, the variation of the skew of the mark sheet is checked, the skew range is updated each time a mark row is processed, and using new skew ranges, the mark rows are successively processed.

Figure 11B:
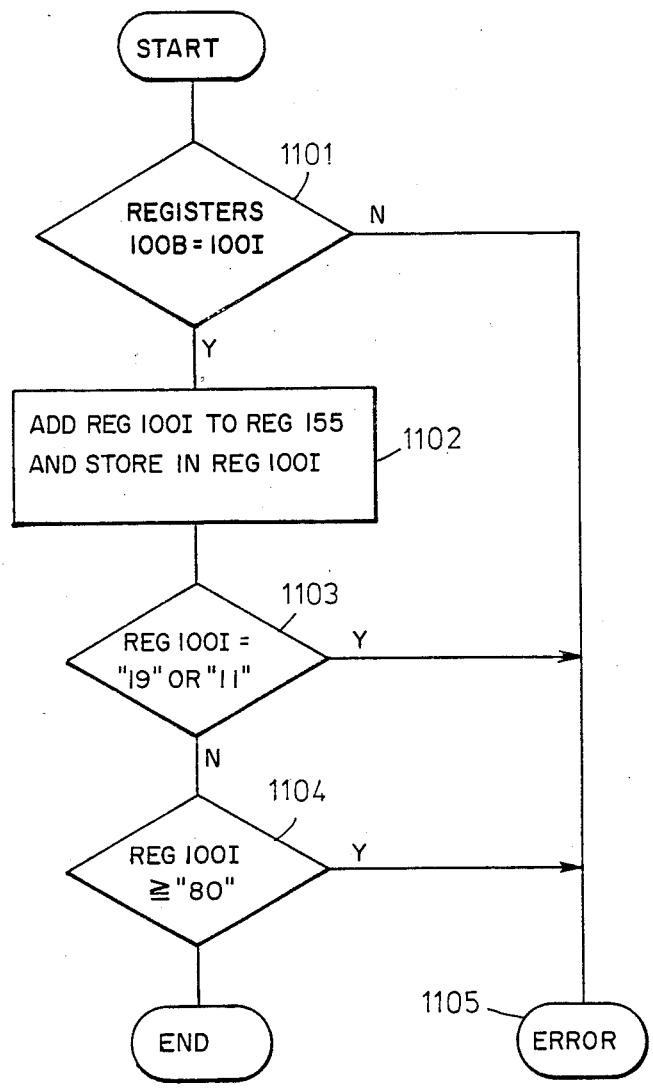
FIG. 11B is a flowchart showing the operation to determine the skew range.

It is noted that in each of the eight tables, i.e., Tables 5 through 8, the position of the left edge of the reference mark is compared with the position of the left edge of the reference mark on the preceding mark row, and the actual scan window address in the mark address storage device is corrected, and the mark on the present mark row is read according to this actual scan window address. Thus, the deviation of the optical system is detected in the first mark row of the mark sheet, and the nominal scan window address is first updated to set the actual scan window address, and in each of following mark row, the actual scan window address for the mark row is set according to the shift of the position of the left edge of the reference mark due to the skew of the mark sheet, and marks in this mark row is read using this address. By this method, the mark reading accuracy for the mark sheet is significantly improved. FIG. 11B shows the operation of the compare circuit 154 and the arithmetic circuit 156 shown in FIG. 11A. In block 1101 where the OR circuit 153 on FIG. 11A outputs the compare circuit trigger signal, the skew range value, or the table pointer, in the main skew register 100B is compared with the skew range value, or the table pointer, in the sub-skew register 100I, and if these are not equal, the operation proceeds to ERROR of block 1105. If these values are equal, the skew range value, or the table pointer, in the sub-skew register 100I is added to the control value in the control value register 155, and the result is again stored in the register 100I.

Next, in block 1103, the arithmetic circuit 156 checks the contents of the sub-skew register 100I, and if the result is YES, the operation proceeds to block 1105, and if it is NO, the operation proceeds to block 1104. According to this invention, assumption is made that the angle of skew during the travelling of the mark sheet does not exceed 2° or once the scan of the mark sheet has begun. The value 19 hex (hexadecimal value: 00011001) of block 1103 shows the variation of the skew range value by +2° or more, and the value 10 hex (hexadecimal value: 00010000) shows the variation of the skew angle by −2° or more. The arithmetic circuit 156 checks whether the variation of skew of the mark sheet whose mark in a certain mark row is being read exceeds the above (allowable) values, and if skew exceeding the allowable values is detected, the circuit decides it as error. When the answer of block 1103 is NO, the operation proceeds to block 1104, and the arithmetic circuit 156 checks the content of the sub-skew register 100I (the result of the add operation stored in block 1102). The reason for selecting 80 hex (hexadecimal value: 10000000) as the error value is that since the leftmost bit position for all valid skew ranges described above is 0. The value 80 hex (hexadecimal value: 10000000) whose left-most bit position 1 was selected to allow an error to be described solely by the high order bit.

Detection of Reference Mark

Figure 12:
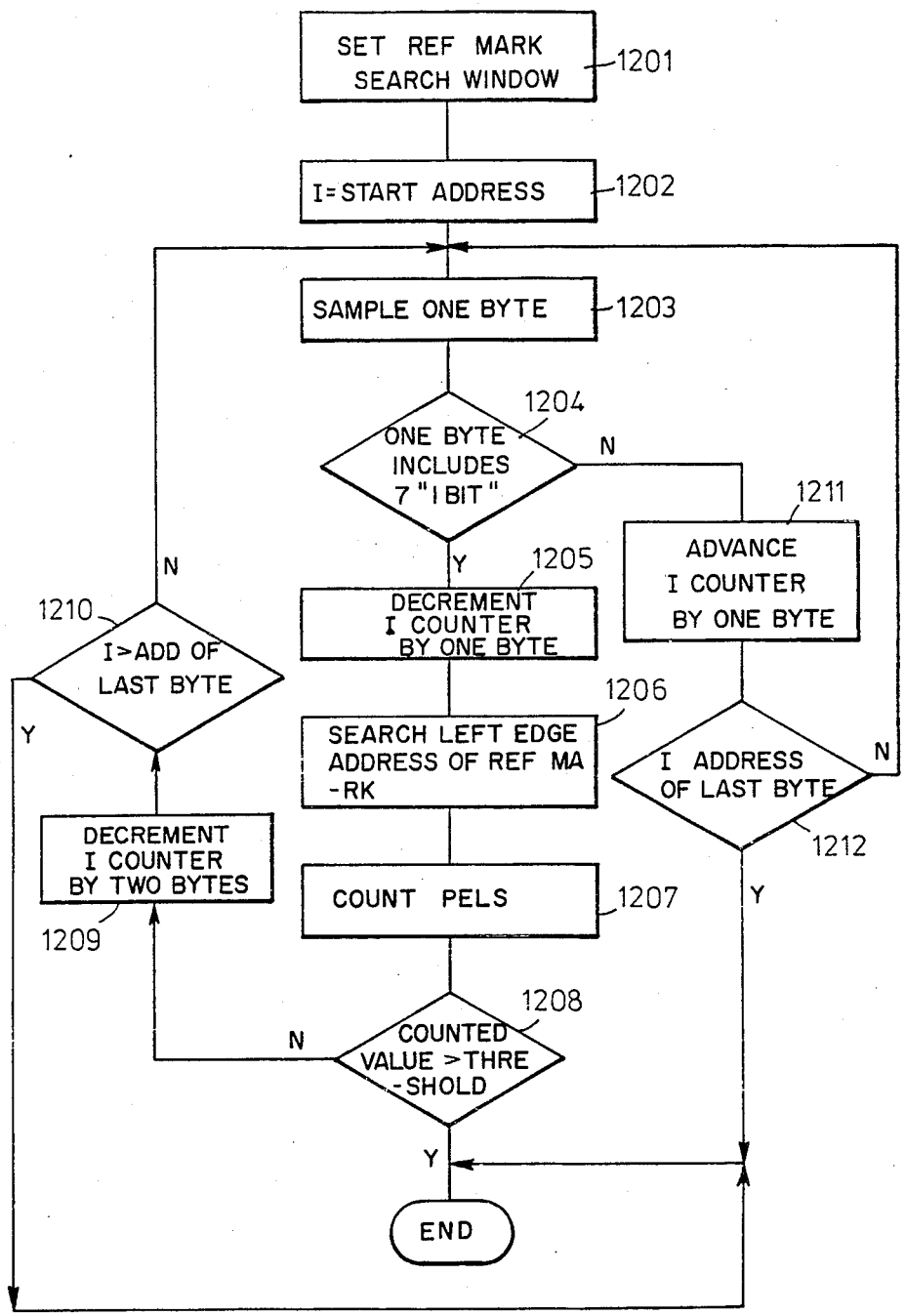
FIG. 12 is a flowchart showing the operation to detect the reference mark.

With referring to FIGS. 1A, 1B and 12, the detection of the reference mark is described.

The reference mark is the reference for all processes of the mark sheet. There may be a black region produced around the reference mark, or a blank portion in the reference mark region. In order to prevent erroneous detection due to these regions, the following method is used in this invention.

Since the position of the reference mark on the mark sheet is predetermined, a certain search area where the reference mark is considered to be present is specified, and the image data in this area is checked for presence of a reference mark. In block 1201 on FIG. 12, the address of the first byte and the address of the final byte are set, in order to specify the reference mark search scan window. This address is the address along the mark row on the mark sheet 102. In block 1202, the counter I is first set to the initiating address, and a byte of bits starting from this address are sampled. After one byte is processed, the count is successively advanced.

Next, one byte, or eight picture elements, of image date in this search scan window are sampled and checked (blocks 1202 and 1203). Then in block 1204, the byte having seven 1 (black) bits in a byte is searched. This is the requirement for the reference mark. When such a byte is found, the left edge of the reference mark is assumed to be present in this byte or in the byte immediately before this byte, and the byte immediately before this byte is taken out (block 1205). Thus every bit in the byte immediately before this byte are checked from left to right, and the address of the 1 (black) bit following the final 0-bit is made to be the address of the left end of the reference mark (block 1206). Even if a number of (e.g., 6) 1 (black) bits continue after the final 0 (white) bit, and then a 0 (white) bit appears, this is deemed as a white noise in the reference mark.

When every byte is checked from the left end, and if two or more 0 (white) bits are found in a byte, the printing of the reference mark is deemed to be inadequate. Referring again to block 1206, the address of the left edge is stored in the sub reference XS register 108A (FIG. 1A). Next, it is determined if the continuous part of 1-bits sampled in block 1206 is the reference mark. For this purpose, the number of picture elements in four bytes including a byte immediately before the byte containing said seven 1-bits is checked (block 1207). If the number of the picture elements is a certain value, it is identified to be the reference mark, and the address of said left edge if identified to be the proper left edge address. Then, the scanning line address at this time, i.e., the address indicating the upper edge of the reference mark is stored in the sub-reference YU register 108B (block 1208), and this operation ends. If the answer of block 1208 is NO, the value of the counter I is reduced by 2 in clock 1209, then the value of the counter I is compared with the address of the final byte in block 1210, and if the value has not reached this address, the operation is returned to block 1203, and if it has reached this address, the operation ends. In block 1204, if it has been found that seven 1 (black) bits are not present in a byte, the address of the counter I is advanced by one byte, and this is compared with the address of the final byte. If it has not reached this address, the operation is returned to block 1203, and if it has reached this address, operation ends.

The following is a brief description of some of the components shown in the drawings:
100 . . . control device, 101 . . . storage device,
102 . . . mark sheet,
103 . . . optical detecting device,
104 . . . detector array,
105 . . . sheet path, 105A . . . reference end,
106 . . . A/D converter,
107 . . . register,
108 . . . timing mark detecting circuit,
109 . . . skew mark detection circuit,
110 . . . skew detection circuit, 100A . . . decoder control device, 100B . . . main skew register, 100C . . . main reference YU register, 100D . . . first skew flag register, 100E . . . second skew flag register, 100F, 100G . . . registers, 100H . . . main reference XS register, 100I . . . sub-skew register, 100J . . . error handling circuit,
111 . . . optical deviation compensation device,
112 . . . subtractor circuit,
113 . . . pitch select circuit,
114 . . . pitch accumulator,
115 . . . shift accumulator,
116 . . . address update/control circuit,
117 . . . scan window address storage device,
118 . . . clock pulse source,
119 . . . buffer register,
121 . . . data compression device,
122 . . . buffer register,
123 . . . table select/read device,
124 . . . table,
125 . . . scan control device Although the present invention is described herein with particularity relative to the foregoing detailed description of an exemplary embodiment, various modifications, changes, additions, and applications of the present invention in addition to those mentioned herein will readily suggest themselves to those having normal skill in the art without departing from the spirit of this invention.

What is claimed is:

1. Apparatus for reading a mark sheet fed in a mark sheet path, said mark sheet being provided with plural mark rows, each of which includes a reference mark, a skew detection mark and mark writing regions between said reference mark and said skew detection mark, which reads said mark sheet by use of predetermined nominal scan window addresses for scanning said mark writing regions to read information in said mark writing regions, said apparatus comprising:

means for scanning said reference mark and said skew detection mark in a first mark row of said mark sheet to detect a distance along said first mark row between said reference mark and said skew detection mark in said first mark row;

means for modifying said nominal scan window addresses by distributing a difference between said detected distance and a nominal distance over said nominal scan window addresses to form actual scan window addresses for said first mark row;

means for scanning said mark writing regions in said first mark row by use of said actual scan window addresses;

means for detecting shift of said reference mark position in a second mark row in the direction of said mark row with respect to said apparatus to shift said actual scan window addresses by the detected shift amount to form actual scan window addresses for second mark row; and means for scanning said mark writing regions in said second mark row by use of said actual scan window addresses for said second mark row.

2. The apparatus in accordance with claim 1 which includes:

means for detecting said reference mark in said first mark row to activate said means for scanning said reference mark and said skew detection mark in said first mark row.

3. Apparatus for reading a mark sheet fed in a mark sheet path, said mark sheet being provided with plural mark rows, each of which includes a reference mark, a skew detection mark and mark writing regions between said reference mark and said skew detection mark, which reads said mark sheet by use of predetermined nominal scan window addresses for scanning said mark writing regions to read information in said mark writing regions, said apparatus comprising:

means for scanning said reference mark and said skew detection mark in a first mark row to detect skew of said mark sheet with respect to said mark sheet path;

means for selecting a group of scan lines for said first mark row in response to said detected skew;

means for detecting a distance along said first mark row between said reference mark and said skew detection mark in said first mark row;

means for modifying said nominal scan window addresses by distributing a difference between said detected distance and a nominal distance over said nominal scan window addresses to form actual scan window addresses for said first mark row;

means for scanning said mark writing regions in said first mark row by use of said actual scan window addresses and at least one scan line in said group of scan lines;

means for selecting a group of scan lines for a second mark row based upon said detected skew;

means for detecting shift of said reference mark position in said second mark row in the direction of said second mark row with respect to said mark sheet path to shift said actual scan window addresses for said first mark row by the detected shift to form actual scan window addresses for said second mark row; and means for scanning said mark writing regions in said second mark row by use of said actual scan window addresses for said second mark row and at least one scan line of said group of scan lines for said second mark row.

4. The apparatus in accordance with claim 3 which includes:

means for detecting said reference mark in said first mark row to activate said means for scanning said reference mark and said skew detection mark in first mark row.

* * * * *